United States Patent [19]

Hamid et al.

[11] Patent Number: 6,072,891

[45] Date of Patent: *Jun. 6, 2000

[54] METHOD OF GATHERING BIOMETRIC INFORMATION

[75] Inventors: Laurence Hamid; Stephen J. Borza, both of Ottawa, Canada

[73] Assignee: Dew Engineering and Development Limited, Ottawa, Canada

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/899,704

[22] Filed: Jul. 24, 1997

Related U.S. Application Data

[63] Continuation-in-part of application No. 08/804,267, Feb. 21, 1997.

[51] Int. Cl.⁷ ....................................................... G06K 9/00
[52] U.S. Cl. ............................................ 382/116; 382/124
[58] Field of Search ..................................... 382/115, 116, 382/124, 127, 225; 340/825.31, 825.34

[56] References Cited

U.S. PATENT DOCUMENTS

| 4,581,760 | 4/1986 | Schiller et al. ......................... 382/124 |
| 5,229,764 | 7/1993 | Matchett et al. ........................ 382/115 |
| 5,448,649 | 9/1995 | Chen et al. .............................. 382/126 |
| 5,613,014 | 3/1997 | Eshera et al. ........................... 382/124 |
| 5,933,515 | 8/1999 | Pu et al. .................................. 382/124 |

FOREIGN PATENT DOCUMENTS

| 61-175865 | 8/1986 | Japan ............................... G06K 9/00 |
| 08016788 | 1/1996 | Japan ............................... G06T 7/00 |
| WO 96/41297 | 12/1996 | WIPO .............................. G06K 9/00 |

*Primary Examiner*—Amelia Au
*Assistant Examiner*—Samir Ahmed
*Attorney, Agent, or Firm*—Neil Teitelbaum & Associates

[57] ABSTRACT

In the past, user authorization based on biometric information was conducted by correlating a single instance of biometric information against a template. By using this method, a percentage of the population is difficult to authenticate. Further, due to skin damage and injuries, sometimes biometric information is not suited to identification. A sore throat affecting voice information and scraped finger tips affecting fingerprint information are two examples of common problems with authorization in dependence upon biometric information. A method of authenticating a user in dependence upon biometric input information is disclosed. The method allows a user to select biometric information sources and a number of repetitions for each source in order to customize the process of biometric user authentication.

26 Claims, 19 Drawing Sheets

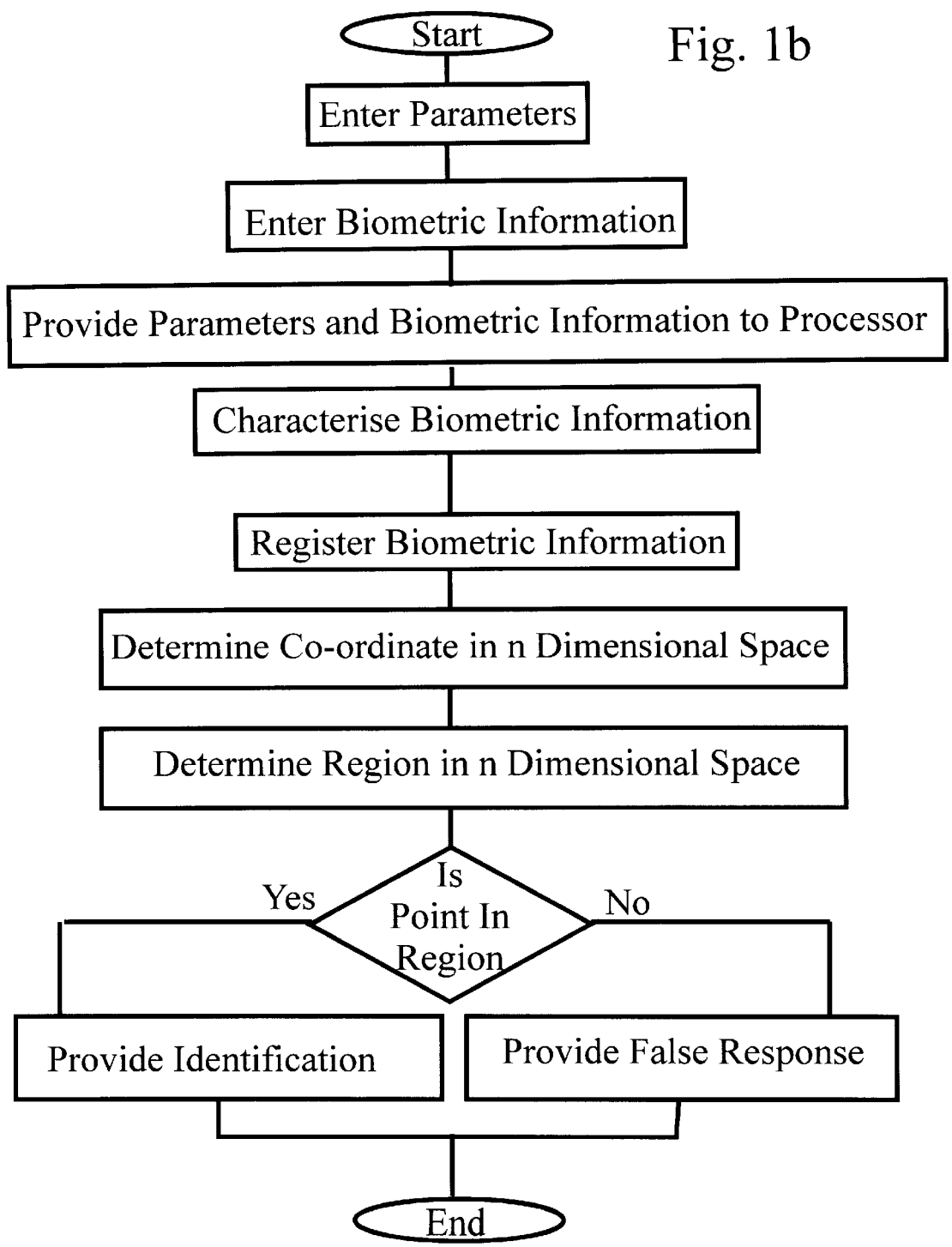

Fig. 2b

Please provide Fingerprint from left ring finger.
Please provide Fingerprint from right thumb.
Please provide Fingerprint from right index finger.

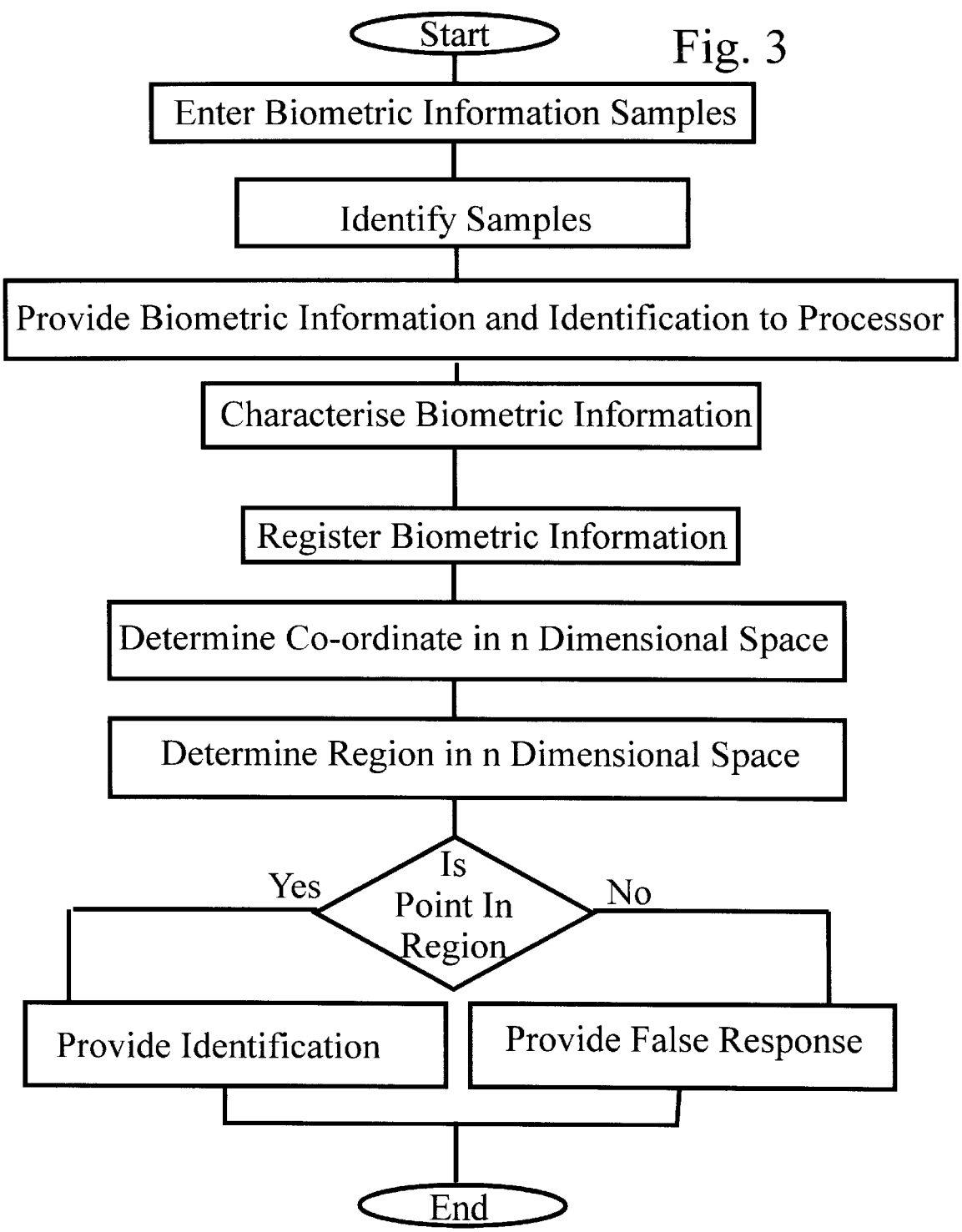

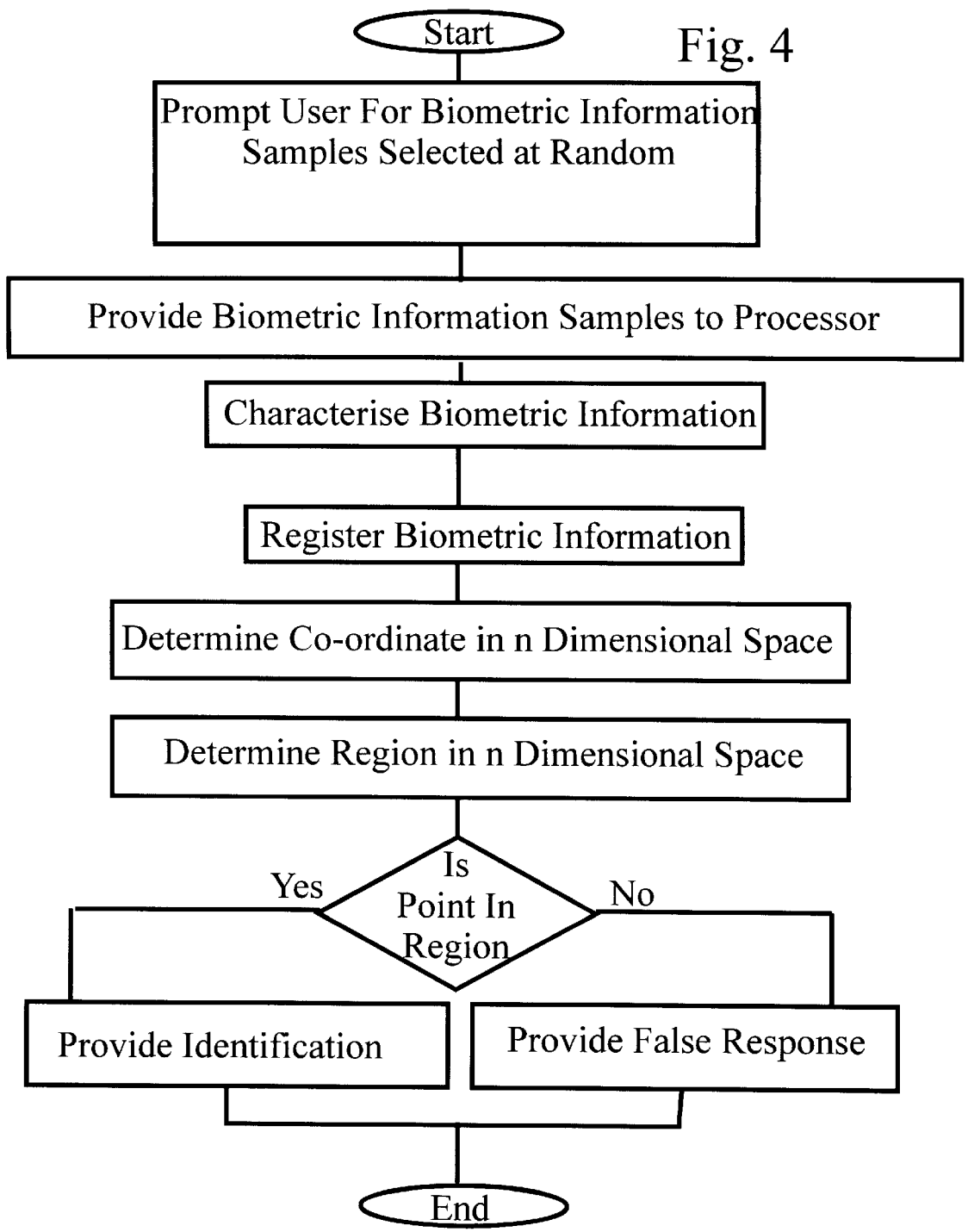

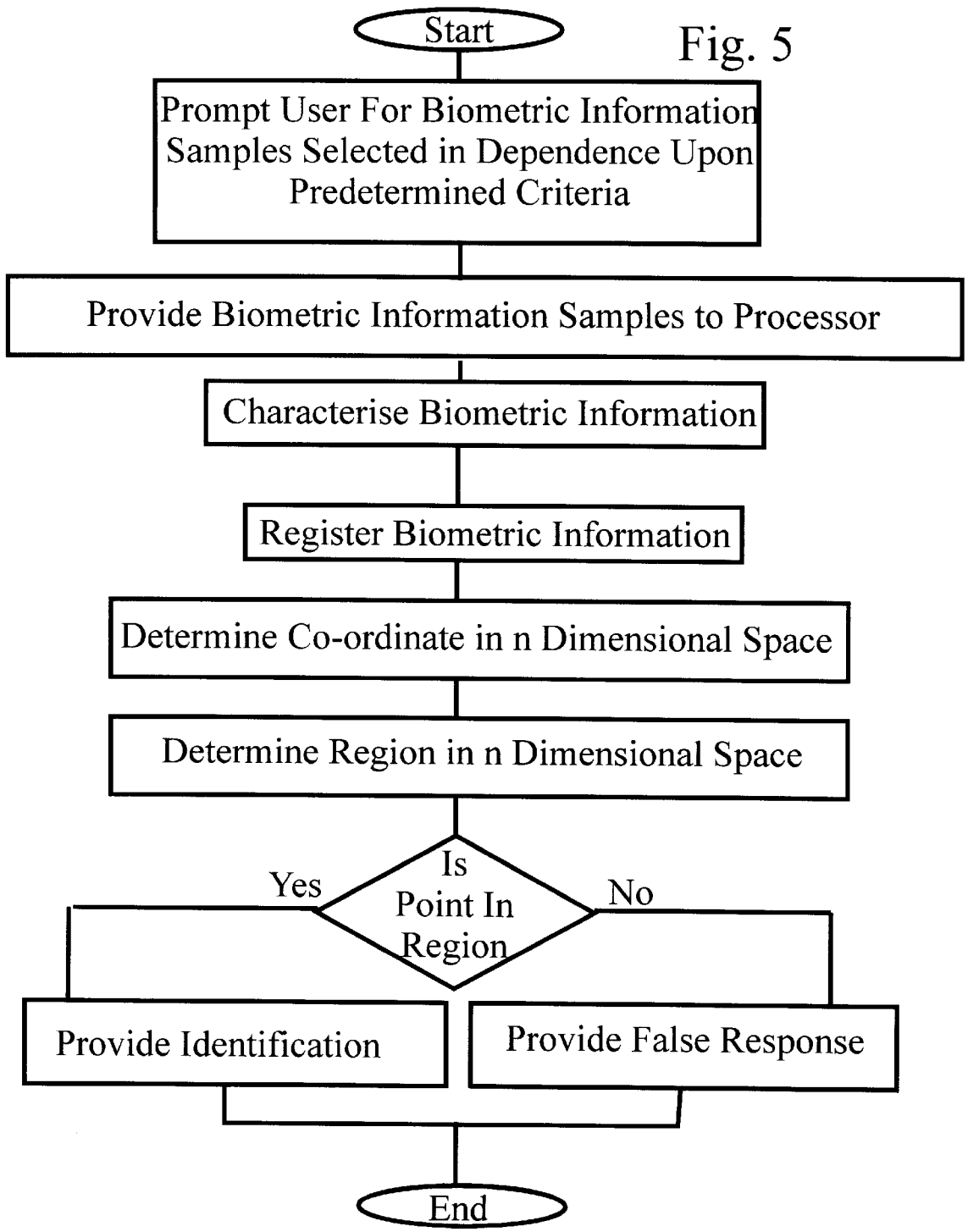

METHOD OF GATHERING BIOMETRIC INFORMATION

This is a continuation-in-part of U.S. patent application Ser. No. 08/804,267, filed on Feb. 21, 1997.

FIELD OF THE INVENTION

This invention relates generally to identification of individuals and more particularly relates to a method of selectively providing biometric information to a system for identification of individuals.

BACKGROUND OF THE INVENTION

Computer security is fast becoming an important issue. With the proliferation of computers and computer networks into all aspects of business and daily life—financial, medical, education, government, and communications—the concern over secure file access is growing. Using passwords is a common method of providing security. Password protection and/or combination type locks are employed for computer network security, automatic teller machines, telephone banking, calling cards, telephone answering services, houses, and safes. These systems generally require the knowledge of an entry code that has been selected by a user or has been preset.

Preset codes are often forgotten as users have no reliable method of remembering them. Writing down the codes and storing them in close proximity to an access control device (i.e. The combination lock) results in a secure access control system with a very insecure code. Alternatively, the nuisance of trying several code variations renders the access control system more of a problem than a solution.

Password systems are known to suffer from other disadvantages. Usually, passwords are specified by a user. Most users, being unsophisticated users of security systems, choose passwords which are relatively insecure. As such, many password systems are easily accessed through a simple trial and error process.

A security access system that provides substantially secure access and does not require a password or access code is a biometric identification system. A biometric identification system accepts unique biometric information from a user and identifies the user by matching the information against information belonging to registered users of the system. One such biometric identification system is a fingerprint recognition system.

In a fingerprint input transducer or sensor, the finger under investigation is usually pressed against a flat surface, such as a side of a glass plate; the ridge and valley pattern of the finger tip is sensed by a sensing means such as an interrogating light beam.

Various optical devices are known which employ prisms upon which a finger whose print is to be identified is placed. The prism has a first surface upon which a finger is placed, a second surface disposed at an acute angle to the first surface through which the fingerprint is viewed and a third illumination surface through which light is directed into the prism. In some cases, the illumination surfacc is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404. Fingerprint identification devices of this nature are generally used to control the building-access or information-access of individuals to buildings, rooms, and devices such as computer terminals.

U.S. Pat. No. 4,353,056 in the name of Tsikos issued Oct. 5, 1982, discloses an alternative kind of fingerprint sensor that uses a capacitive sensing approach. The described sensor has a two dimensional, row and column, array of capacitors, each comprising a pair of spaced electrodes, carried in a sensing member and covered by an insulating film. The sensors rely upon deformation to the sensing member caused by a finger being placed thereon so as to vary locally the spacing between capacitor electrodes, according to the ridge/trough pattern of the fingerprint, and hence, the capacitance of the capacitors. In one arrangement, the capacitors of each column are connected in series with the columns of capacitors connected in parallel and a voltage is applied across the columns. In another arrangement, a voltage is applied to each individual capacitor in the array. Sensing in the respective two arrangements is accomplished by detecting the change of voltage distribution in the series connected capacitors or by measuring the voltage values of the individual capacitances resulting from local deformation. To achieve this, an individual connection is required from the detection circuit to each capacitor.

Before the advent of computers and imaging devices, research was conducted into fingerprint characterisation and identification. Today, much of the research focus in biometrics has been directed toward improving the input transducer and the quality of the biometric input data. Fingerprint characterization is well known and can involve many aspects of fingerprint analysis. The analysis of fingerprints is discussed in the following references which are hereby incorporated by reference:

Xiao Qinghan and Bian Zhaoqi,: An approach to Fingerprint Identification By Using the Attributes of Feature Lines of Fingerprint," IEEE Pattern Recognition, pp 663, 1986;

C. B. Shelman, "Fingerprint Classification—Theory and Application," Proc. 76 Carnahan Conference on Electronic Crime Countermeasures, 1976;

Feri Pernus, Stanko Kovacic, and Ludvik Gyergyek, "Minutaie Based Fingerprint Registration," IEEE Pattern Recognition, pp 1380, 1980;

J. A. Ratkovic. F. W. Blackwell, and H. H. Bailey, "Concepts for a Next Generation Automated Fingerprint System," Proc. 78 Carnahan Conference on Electronic Crime Countermeasures, 1978;

K. Millard, "An approach to the Automatic Retrieval of Latent Fingerprints," Proc. 75 Carnahan Conference on Electronic Crime Countermeasures, 1975;

Moayer and K. S. Fu, "A Syntactic Approach to Fingerprint Pattern Recognition," Memo Np. 73-18, Purdue University, School of Electrical Engineering, 1973;

Wegstein, *An Automated Fingerprint Identification System*, NBS special publication, U.S. Department of Commerce/ National Bureau of Standards, ISSN 0083-1883; no. 500–89, 1982;

Moenssens. Andre A., *Fingerprint Techniques*, Chilton Book Co., 1971; and,

Wegstein and J. F. Rafferty, *The LX39 Latent Fingerprint Matcher*, NBS special publication, U.S. Department of Commerce/National Bureau of Standards; no. 500–36, 1978.

OBJECT OF THE INVENTION

It is an object of this invention to provide a method for selectively entering biometric information for verification and for verification of an identity of a source of the biometric information.

It is a further object of the invention to provide a method of expanding the flexibility of biometric identification systems.

SUMMARY OF THE INVENTION

In accordance with the invention there is provided a method of registering biometric information of an individual comprising the steps of:

a) providing a first biometric information sample from a biometric source of the individual to a biometric input device in communication with a host processor;

b) using the host processor, registering the first biometric information sample with a first template to produce a first registration value;

c) when the first registration value is within predetermined limits, identifying the individual;

d) when the first registration value is within other predetermined limits, providing a current biometric information sample from a different biometric source of the individual to a biometric input device in communication with the host processor;

e) using the host processor, registering the current biometric information sample with a second template to produce a current registration value;

f) when the first registration value and the current registration value are within predetermined limits, identifying the individual; and g) when the first registration value and the current registration value are within second other predetermined limits, repeating steps (d) through (g).

In an embodiment the step of when the first registration value and the current registration value are within second other predetermined limits, repeating steps (d) through (g) comprises the steps of:

the host processor determining biometric information sources for provision to the biometric input means; and, prompting the individual for further biometric information.

In accordance with the invention there is provided a method of registering biometric information of an individual comprising the steps of:

providing biometric information from a first biometric information source of the individual;

iteratively performing the steps of:

registering the biometric information against a template associated with an identity to produce a registration value and associating the value with the biometric information source and the identity;

determining a correlation between the individual and the identity in dependence upon the produced registration values;

when the correlation is within first predetermined limits, providing biometric information from a second other biometric information source of the individual;

until the correlation is within second other predetermined limits.

In accordance with the invention there is further provided a method of registering biometric information of an individual in dependence upon stored templates of biometric information comprising the steps of:

a) providing an indication of the individual's identity;

b) providing biometric information from a known biometric information source of the individual to a host processor;

c) registering the biometric information against a template of biometric information from the same source to determine a registration value using the host processor;

d) determining if a point having coordinates in an n-dimensional space, n having an integer value greater than 0, and having coordinates corresponding substantially to the registration values falls within an n-dimensional range determined in dependence upon a predetermined false acceptance rate;

e) identifying the individual when the point falls within the n-dimensional range corresponding to the predetermined false acceptance rate; and, f) repeating steps (b) through (f) when the point falls within a second other n-dimensional range.

It is an advantage of the present invention to lessen false registrations while, at a same time, increasing a number of people identified by a biometric security system.

BRIEF DESCRIPTION OF THE DRAWINGS

An exemplary embodiment of the invention will now be described in conjunction with the attached drawings, in which:

FIG. 1b is a flow diagram of a method of providing biometric information and identifying a user in dependence thereon according to the invention;

FIG. 2b is a simplified diagram of a display having prompts thereon requesting provision of biometric information from predetermined biometric information sources;

FIG. 3 is a flow diagram of another method of providing biometric information and identifying a user in dependence thereon according to the invention;

FIG. 4 is a flow diagram of another method of providing biometric information and identifying a user in dependence thereon according to the invention;

FIG. 5 is a flow diagram of another method of providing biometric information and identifying a user in dependence thereon according to the invention;

DETAILED DESCRIPTION

The invention is described with respect to finger print registration. The method of this invention is applicable to other biometric verification processes as is evident to those of skill in the art.

One of the problems with a finger print biometric is that a segment of the population can have temporary or permanent skin conditions which cause poor image quality on the scanning device which in turn causes them to experience high false rejection rates. By allowing candidates to use more than one finger during authentication, lower thresholds for authentication are combined in a way which confirms identities yet does not compromise the level of false acceptances for the system.

Thresholds from a set of distinct finger prints from a candidate that would usually be rejected for being too insecure are combined according to this method to allow acceptance in dependence upon a plurality of biometric information samples. Thus a candidate lowers the chance of being falsely rejected by supplying multiple biometric information samples in the form of fingerprints for authentication.

Figure 1:
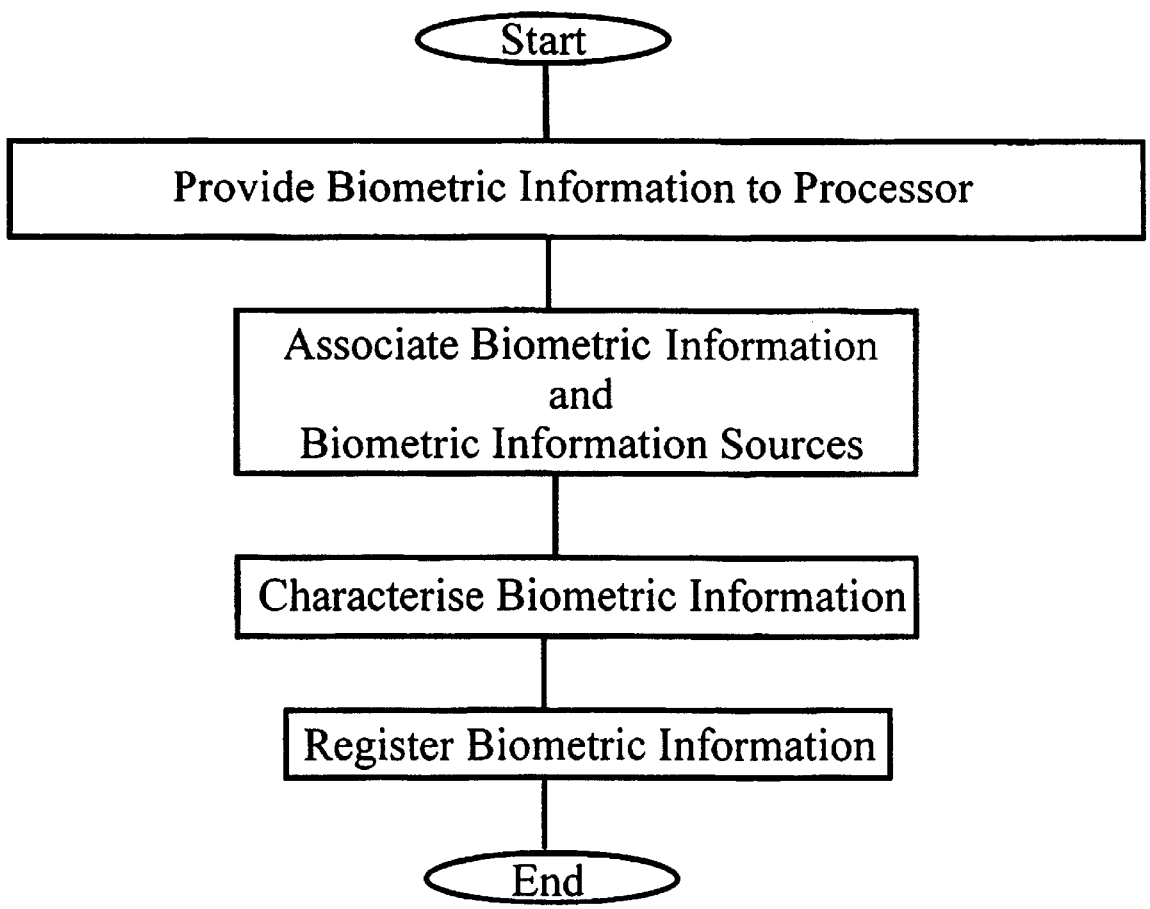
FIG. 1 is a flow diagram of a method of providing biometric information according to the invention.

Referring to FIG. 1, a flow diagram of an embodiment of the invention is shown. Biometric information in the form of fingerprints is provided to a processor. According to the invention, a plurality of samples from at least two biometric information sources are provided. These samples are in the form of fingerprints, palm prints, voice samples, retinal scans, or other biometric information samples.

Requiring an individual to enter biometric information samples from at least two biometric information sources, allows for improved registration results and reduced false acceptance. For example, some individuals are known to be commonly falsely accepted or identified. The false acceptance often is a result of similarities between biometric information samples from a biometric information source of a registered individual and from a biometric information source of another individual. These similarities are often only present for a specific similar biometric information source such as a left index finger or a right thumb. The provision and registration of two biometric information samples, reduces likelihood of similarity because, where before similarity of a single biometric information source resulted in false acceptance, now similarity in two different sources is unlikely. Therefore, requiring a minimum of two biometric information sources reduces any likelihood of false acceptance. The use of a plurality of varied biometric information sources in the form of retinal scans, voice prints, finger prints, palm prints, toe prints, etc. further reduces probability of false registration; it is unlikely that the varied biometric information from two individuals is similar.

Similarly, requiring an individual to enter biometric information samples from at least two biometric information sources reduces the probability of false rejection. As the likelihood of false acceptance decreases, a lower threshold for acceptance becomes acceptable. Both false rejection and false acceptance are reduced.

Each biometric information sample is associated with a biometric information source in the form of a fingertip, a retina, a voice, a palm, etc. The association, allows for comparison between the biometric information sample and a template associated with the biometric information source. When an individual's identity is provided to the processor or is known, the biometric information sample is only compared to a single template associated with the biometric information source. Alternatively, the biometric information sample is compared against a plurality of templates. Comparing biometric information samples is often referred to as registering the biometric information samples. Many methods are known for performing the registration. Commonly, the biometric information sample is characterized according to a method specific to the template. The template and the characterized biometric information sample are compared to determine a registration value. The registration value is then used to determine identification; to provide access to a system or structure; to log access; to monitor use; for billing; or for other purposes.

When an individual's alleged identity is not provided to the processor or known to the processor, the characterized biometric information is registered against templates stored in a database of templates in order to locate those registrations which are indicative of a predetermined characteristic. The characteristic is often identity but other characteristics are also known. Because a plurality of biometric information samples are provided, the registration against templates is for locating a plurality of templates which are indicative of a predetermined characteristic. When the characteristic is identity, the templates are from a same individual and the registration process tries to locate a set of templates that registers with the characterized biometric information samples resulting in a set of values indicative of accurate identification.

Referring to FIG. 1b, a flow diagram of an embodiment of the invention for identifying an individual is shown. An individual seeking authentication by a user authorization system is presented with a parameter entry means. Parameter entry means are well known in the art of computer science. Some examples of parameter entry means include dedicated switches; software for execution on a processor and for providing an individual with means for selecting or customizing parameters in the form of prompts, a command line, or a graphical user interface; cards or other storage means for provision to a device capable of reading stored parameters and providing them to a processor; wireless data entry; and voice data entry systems.

Figure 2:
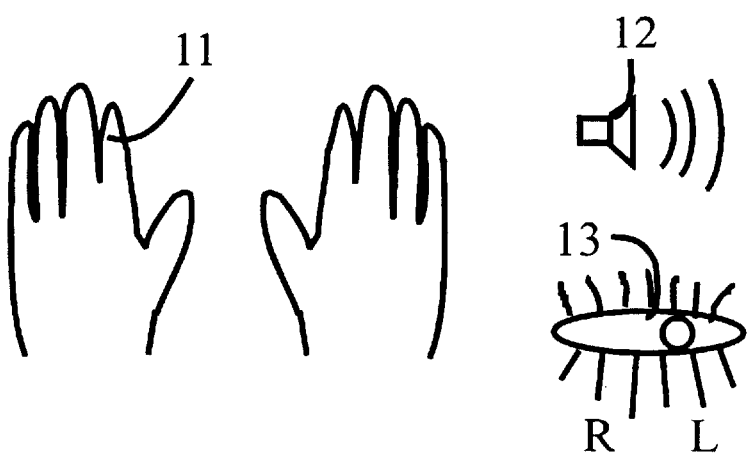
FIG. 2 is a simplified diagram of a user interface for entering parameters according to the invention.

Using the parameter entry means, the individual determines biometric information sample parameters. The parameters are selected from a known group of available parameters. Examples of known groups of biometric information samples include (right index finger, left index finger, left thumb); (right index finger, voice); (retinal scan, voice); (left thumb, left middle finger); etc. Groupings reduce user entry requirements; however, groupings also reduce flexibility. Alternatively, parameters are entered by an individual selecting from all available parameters in order to determine a group. For example, an individual is presented with a graphical display, as shown in FIG. 2, of biometric information sources in the form of fingers 11 and selects a number of samples for each source. When a voice recognition system is incorporated into the user authorization system, an icon 12 representing voice is also displayed. When a retinal scanning system is incorporated, an icon 13 representing the retinal scan is displayed. Other icons are displayed when corresponding biometric identification systems are present. The individual enters parameters in the form of identifying biometric information sources and for each source a quantity of samples being provided.

Preferably a minimum set of requirements exist which, though flexible, ensures sufficient levels of security. Requiring each individual to enter information from a minimum number of biometric information sources and perhaps a maximum number of samples from a same biometric information source, allows for maintenance of at least a predetermined security level.

Once the parameters have been entered, the individual enters biometric information in the form of fingerprints into the system in accordance with the parameters. Preferably, the parameters once selected are sent to a processor for analysis and the individual is prompted to enter each biometric information sample. Alternatively, the parameters and the biometric information in the form of representations of fingerprints are sent to a processor together.

Figure 2A:
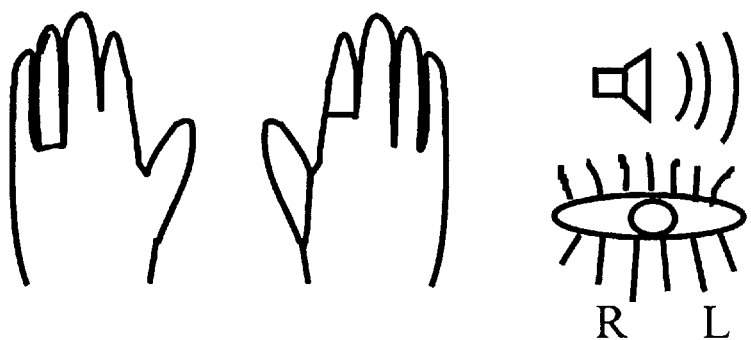
FIG. 2a is a simplified diagram of FIG. 2 with some parameters selected for entry.

The biometric information provided by the individual is related to the parameters selected. For example, referring to FIG. 2a, when the individual selects left ring finger once, right thumb once, and right index finger once, the individual then provides a sample of a fingerprint from the left ring finger, a fingerprint sample from the right thumb and a fingerprint sample from the right index finger. Prompting, shown in FIG. 2b, allows the individual to select very complicated sets of biometric information sources or to select from predetermined sets without remembering the parameters and/or an order for the parameters.

A biometric input means in the form of a live fingerprint scanning device is used to collect the biometric information in the form of images of fingerprints of the individual which are entered in a predetermined order. Each biometric information sample is identified. When the individual is prompted for a biometric information sample, the processor labels the samples. Alternatively, an individual enters parameters and biometric information simultaneously by entering a biometric information sample and identifying the sample as, for example, a specific fingerprint or a voice sample. Optionally, the individual is provided with a means of reviewing and accepting or discarding biometric information samples.

The authentication procedure determines an independent sequence of comparison scores from the input provided by the candidate. This sequence is considered to be a point, hereinafter referred to as P, in n-dimensional vector space, $R^n$. A threshold function $h_\alpha: R^n \rightarrow R$ is used to determine whether or not the point belongs to a set $U_\alpha$ by $P \epsilon U_\alpha \Leftrightarrow h_\alpha(P) \geq C_\alpha$. The identity of the individual is confirmed if and only if $P \epsilon U_\alpha$.

The biometric information sample identifiers are used to uniquely identify the input samples. Let I be the set of input images, $I = \{I_i | 1 \leq i \leq N\}$. For $I_i \epsilon I$, let $Id_i$ be the identifier of an image, let $T_i$ be the characterization or template of the image, and let $T_i^*$ be the reference template of the image.

Define the equivalence relation $\equiv$, on the set I by $$I_i \equiv I_j \Leftrightarrow Id_i = Id_j,$$

The sets $$H_k = \{I_i | I_i \equiv I_k\}$$

are equivalence classes that partition the set of input images into sets of images that belong to a same finger tip. There are n of these classes where $1 \leq n \leq N$.

When $\tau$ is a set of all fingerprint templates generated by a given characterization algorithm and score: $\tau \times \tau \rightarrow R$ is the measure generated by an associated matching algorithm, then we can construct a set of class representative, $I_R$, which contains one representative for each $H_k$:

$$I_R = \{I_i \epsilon H_k | \text{score}(T_j, T_j^*) = \max I_i \epsilon H_k \{\text{score}(T_i, T_i^*)\} 1 \leq k \leq N\}$$

The set $I_R \subset I$, is then a set of images of the distinct input fingerprints that achieve the highest scores. Alternatively, multiple samples of a same fingerprint are considered.

For each $I_i \epsilon I_R$, $1 \leq i \leq n$, let $x_i = \text{score}(T_i, T_i^*)$ correspond to scores from the matching algorithm. Any ordering of these scores is a point in the vector space $R^n$, simply by constructing the n-tuple $(x_1, x_2, \ldots, x_n) = P$.

Essentially, as shown in FIG. 1, once a set of parameters is selected, a graphical distribution of identifications is achievable in n-dimensions. The biometric information samples are provided to a processor. Registration is conducted against known templates in dependence upon the selected parameters. Once registration is complete, a single point is determined having coordinates equal to each of at least some of the registration results. Alternatively, the point has coordinates determined in dependence upon the registration results but not equal thereto. Plotting the point results in a point plotted in n-dimensional space. The processor then determines a probability distribution for the selected parameters. Alternatively, this is performed prior to the registration process for biometric information samples. Further, Alternatively the probability distributions are determined or approximated in advance and stored in non-volatile memory.

Given an n-dimensional plot defined by a boundary function and a single point, a comparison determines whether or not the point falls below or above the function and optionally within or outside other known ranges. Stated differently, the point is analyzed to determine whether it falls within a suitable region wherein region is defined as an n-dimensional region having at least some known boundaries. When the point falls within a predetermined or suitable region, the individual is identified. When the point falls outside the predetermined or suitable region, the individual is not identified. The identification system then responds accordingly. Responses in the form of locking an individual out, denying an individual access, logging an attempted entry by an unidentified individual, etc. are well known and are beyond the scope of the present invention.

Referring to FIG. 3, a simplified flow diagram of another method according to the invention is shown. Biometric information samples are provided to a processor and associated with their biometric information sources in the form of finger tips, eyes, palm, or voice. The biometric information samples and the associated information are provided to a processor. The processor characterises the biometric information samples and registers them against templates. When the individual's alleged identification is known, registration is performed against templates associated with the individual and associated with same biometric information sources. Identification of an individual is conducted in a fashion similar to that set out for FIG. 1b above.

Referring to FIG. 4, a simplified flow diagram of another method according to the invention is shown. A processor prompts an individual for biometric information samples associated with biometric information sources selected by the processor at random. The biometric information samples are provided to the processor. The processor characterises the biometric information samples and registers them against templates. When the individual's alleged identification is known, registration is performed against templates associated with the same biometric information sources of the individual. Identification of an individual is conducted in a fashion similar to that set out for FIG. 1b above.

Referring to FIG. 5, a simplified flow diagram of another method according to the invention is shown. A processor prompts an individual for biometric information samples associated with biometric information sources selected by the processor according to a predetermined algorithm. Optionally, the predetermined algorithm selects the biometric information sources in dependence upon the alleged identity of the user. The biometric information samples are provided to the processor. The processor characterises the biometric information samples and registers them against templates. When the individual's alleged identification is known, registration is performed against templates associated with the same biometric information sources of the individual. Identification of an individual is conducted in a fashion similar to that set out for FIG. 1b above.

Figure 6:
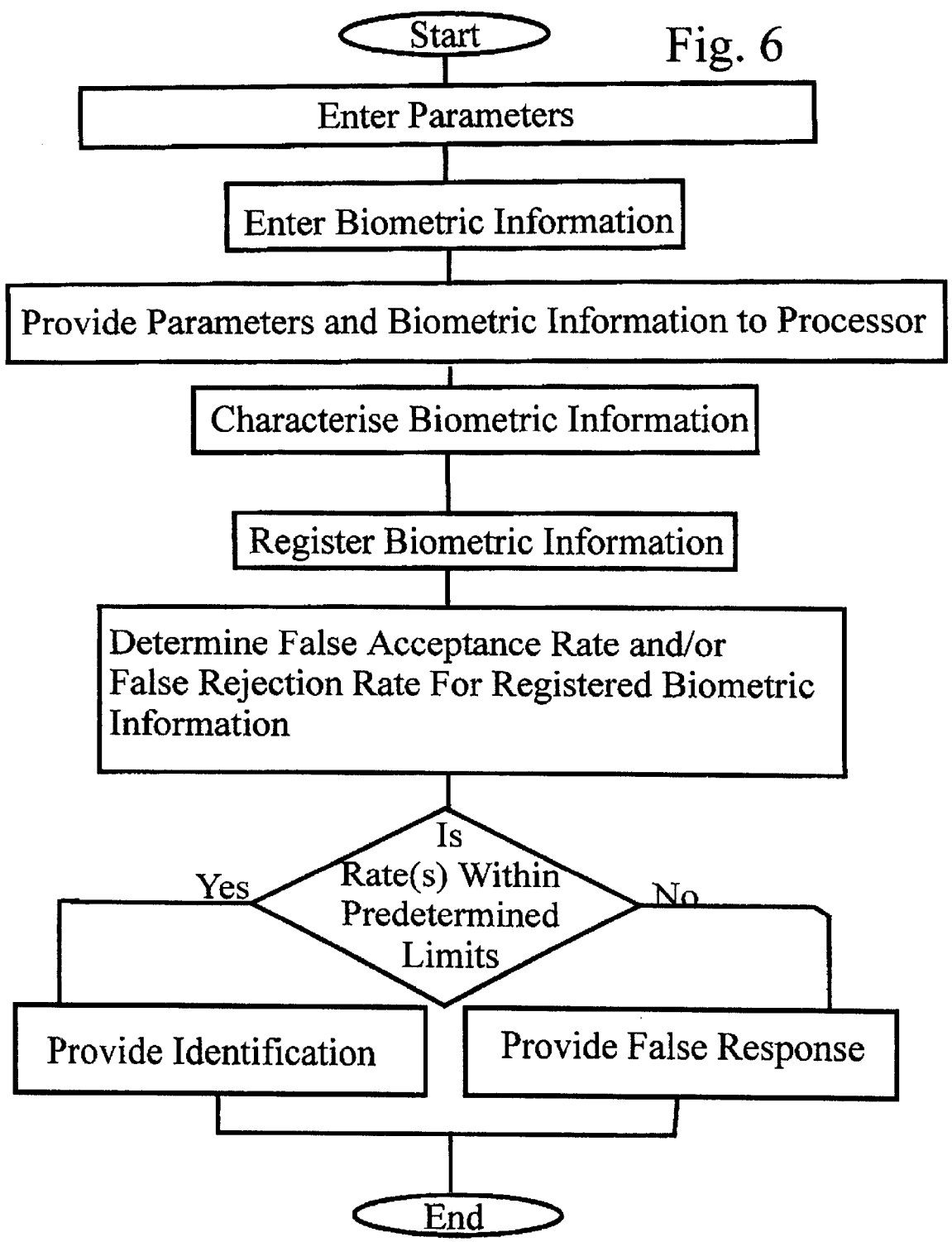
FIG. 6 is a flow diagram of another method of providing biometric information and identifying a user in dependence thereon according to the invention.

Referring to FIG. 6, a simplified flow diagram of another method according to the invention is shown. Biometric information samples and associated parameters are provided to a processor. The processor characterises the biometric information samples and registers them against templates. When the individual's alleged identification is known, registration is performed against templates associated with the individual and associated with same biometric information sources. Identification of an individual is performed by evaluating resulting values from the registration to determine a probability, for those results, of false acceptance and false rejection. When the value is within predetermined limits for an acceptable value, identification is provided. When the value falls outside the predetermined limits identification is not provided.

Figure 7:
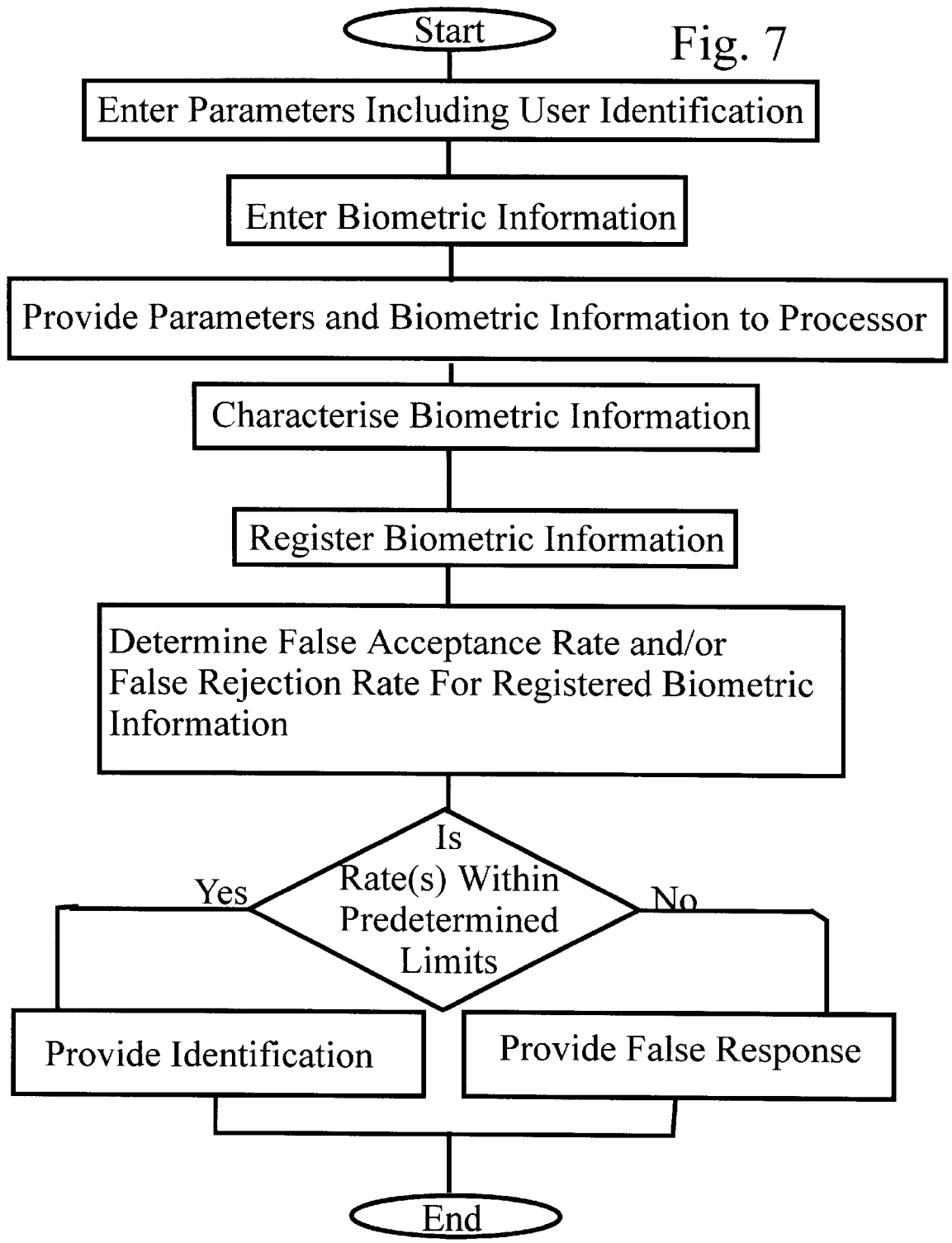
FIG. 7 is a flow diagram of another method of providing biometric information and identifying a user in dependence thereon according to the invention.

Referring to FIG. 7, a simplified flow diagram of another method according to the invention is shown. Biometric information samples and associated parameters including an alleged identification of the individual are provided to a processor. The processor characterises the biometric information samples and registers them against templates. When the individual's alleged identification is known, registration is performed against templates associated with the individual and associated with same biometric information sources. Identification of an individual is performed by evaluating resulting values from the registration to determine a probability, for those results, of false acceptance and false rejection. When the value is within predetermined limits for an acceptable value, identification is provided. When the value falls outside the predetermined limits identification is not provided.

Figure 8:
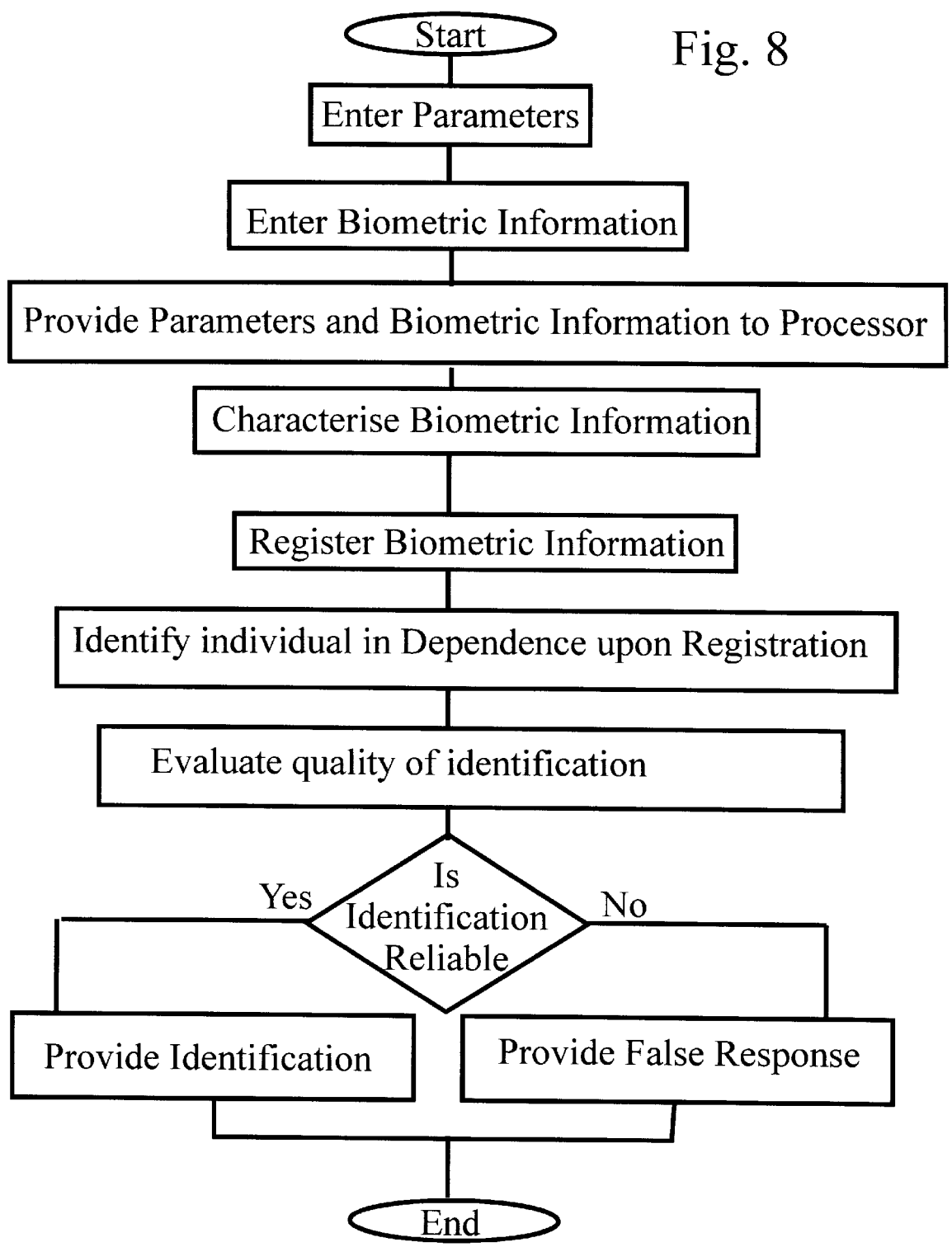
FIG. 8 is a flow diagram of another method of providing biometric information and identifying an individual in dependence thereon according to the invention.

Referring to FIG. 8, a simplified flow diagram of another method according to the invention is shown. Biometric information samples and associated parameters are provided to a processor. The processor characterises the biometric information samples and registers them against templates. When the individual's alleged identification is known, registration is performed against templates associated with the individual and associated with same biometric information sources. Identification of an individual is performed by evaluating resulting values from the registration to determine a quality of user identification. When the quality is within predetermined limits for an acceptable quality, identification is provided. When the value falls outside the predetermined limits identification is not provided.

Figure 9:
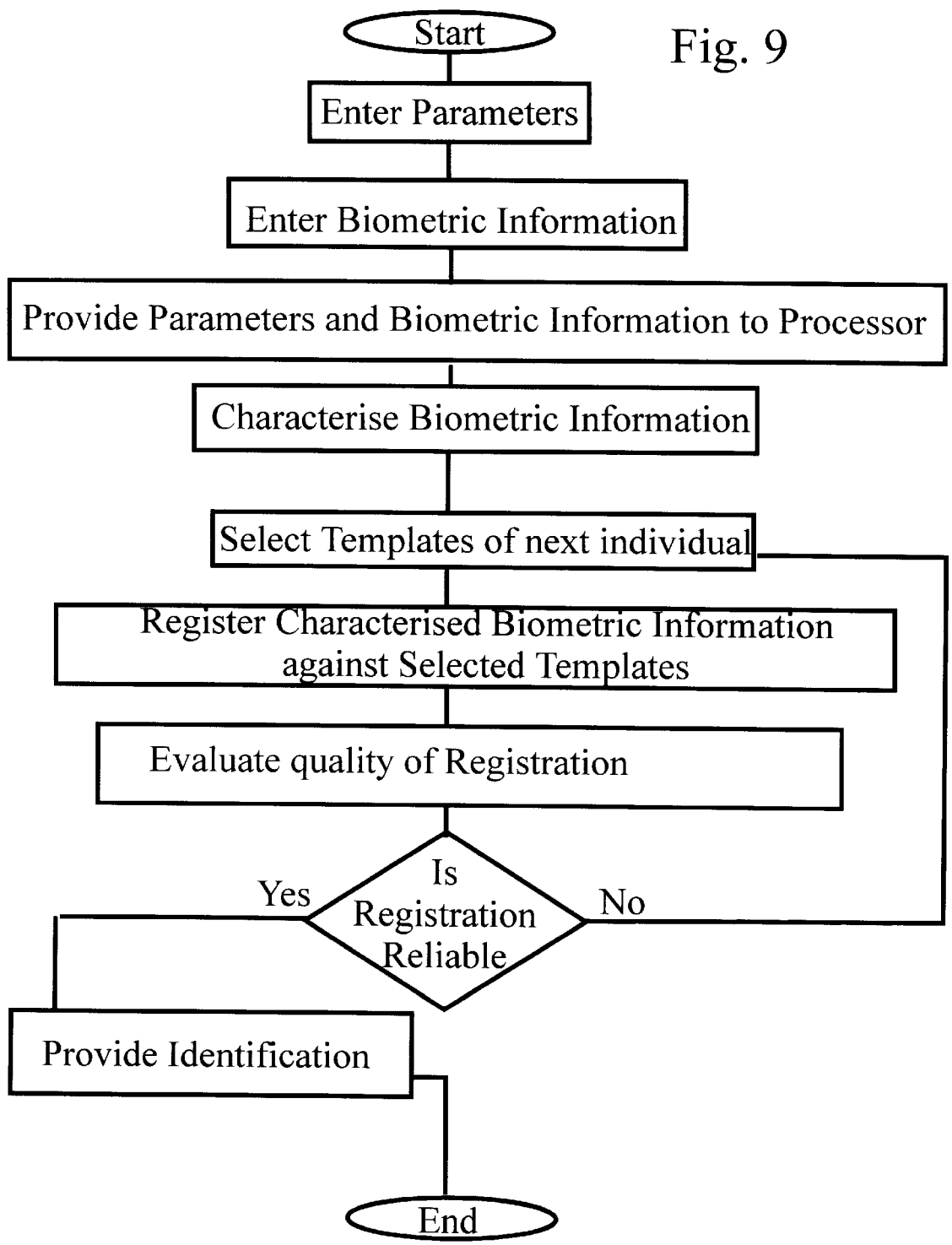
FIG. 9 is a flow diagram of another method of providing biometric information and identifying an individual in dependence thereon according to the invention.

Referring to FIG. 9, a simplified flow diagram of another method according to the invention is shown. Biometric information samples from an individual and associated parameters are provided to a processor. The processor characterises the biometric information samples and registers them against templates. A first set of templates associated with an individual and associated with same biometric information sources is selected. Registration of the biometric information samples is performed against the selected templates producing registration values. In dependence upon these values a quality of user identification is determined. When the quality is within predetermined limits for an acceptable quality, identification is provided. When the value falls outside the predetermined limits identification is not provided and a next set of templates is selected. Optionally, once all sets of templates are exhausted, an indication of failure to identify is provided.

Figure 10:
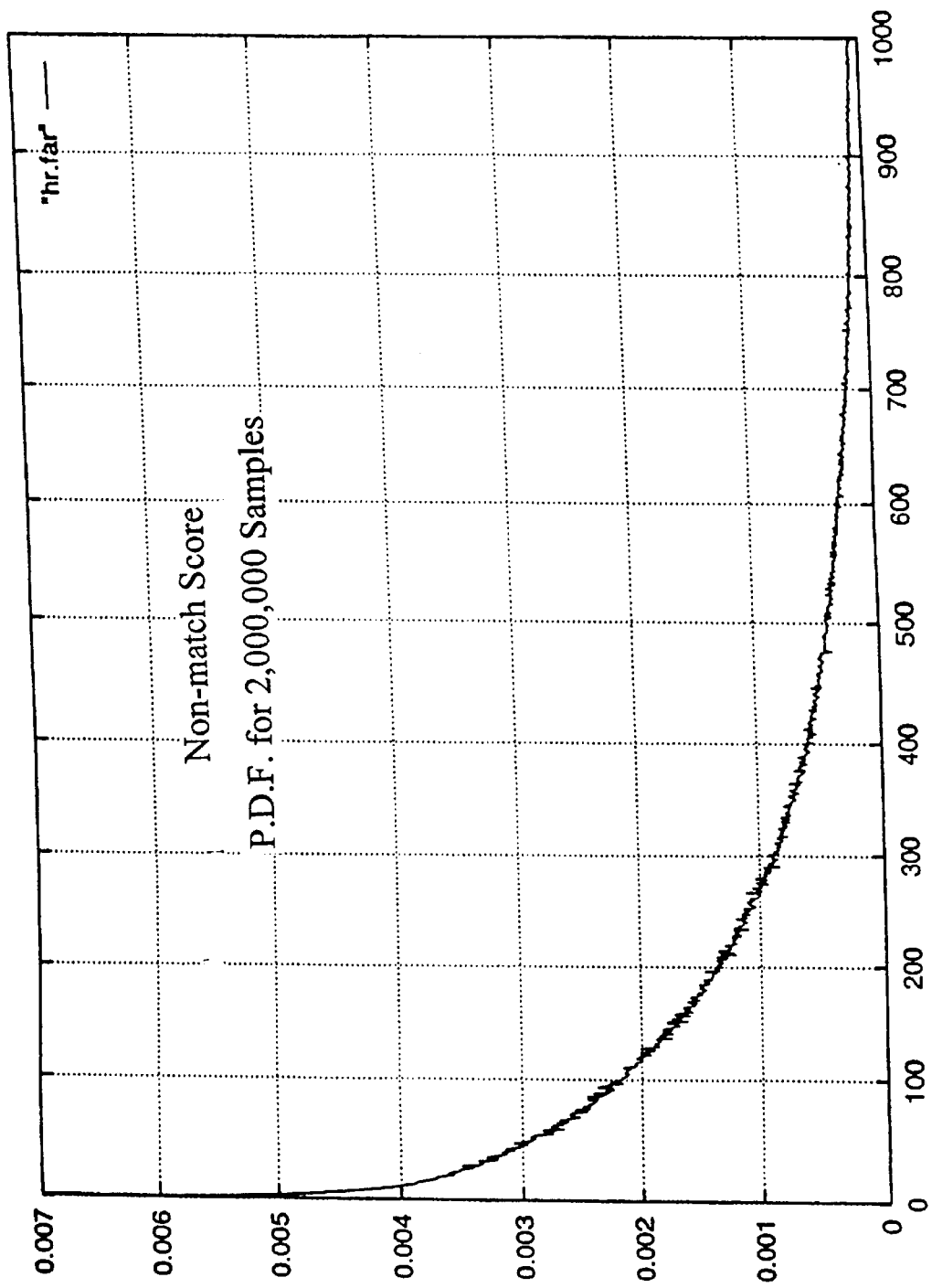
FIG. 10 is a probability distribution curve for individual identification using a biometric information sample.

Referring to FIG. 10, a two dimensional probability distribution is shown. The total area below the distribution curve is 1 unit area. Using such a curve, false acceptance or false registration is described. Most biometric information samples are easily characterized. The high initial point on the probability curve and the steep decent to an asymptotic curve approaching 0 shows this. The line t marks the cutoff for registration effectiveness. This is determined in dependence upon an algorithm chosen and upon system limitations such as processor speed, memory, and security requirements. The shaded region bounded by $Y=0$, $X>t$, and the probability curve represents false acceptances.

Figure 11:
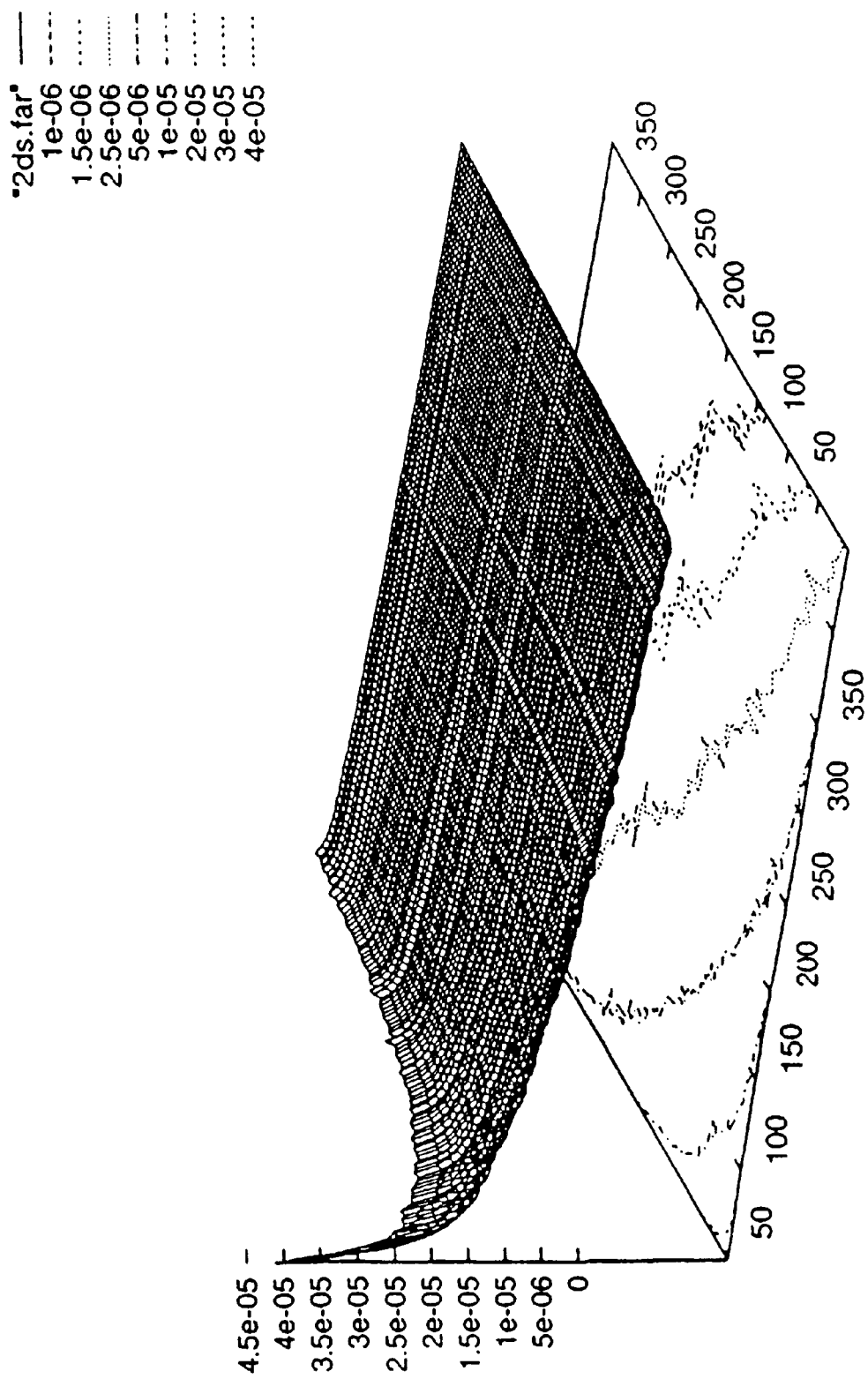
FIG. 11 is a two dimensional probability distribution surface for individual identification in dependence upon a plurality of biometric information samples.

Referring to FIG. 11, a truncated two dimensional probability distribution curve is shown. Now, false acceptance is represented by a region of three dimensional space having a volume of 1 unit$^2$. Upon viewing the graph of actual data for fingerprint biometric information, it is apparent that the graph is symmetrical and that the graph extends toward infinity without reaching the plane $z=0$. Further, the diagonal center of the surface $x=y$ is a minimum for a given x and y.

A plot showing an acceptance curve for registration is contained below the curve of FIG. 11. Here two parameters either from separate registrations or from a same biometric information sample registration are evaluated to determine a point. When the point falls below the line, the biometric information is not identified and correspondingly the individual is not identified. Alternatively, when the point falls within the shaded region, registration occurs. Extending this to a plurality of biometric information samples results in regions allowing for excellent registration of some samples, as shown in FIG. 11 at B, with moderate registrations of other samples. Using a plurality of biometric information samples, allows equivalent registration algorithms to provide greatly enhanced security or alternatively, allows faster and simpler registration algorithms to provide equivalent security.

In evaluating security of biometric authorization systems, false acceptance and false rejections are evaluated as a fraction of a user population. A security system is characterized as allowing 1 in 1,000 false acceptances or, alternatively, 1 in 1,000,000. Extending the graph of FIG. 11 to n dimensions, results in a different distribution for a region representing acceptance and, therefore, a match scores of a single biometric information sample that falls outside the shaded region of FIG. 11, when combined with several other similarly weak biometric information samples, is more likely to fall within an acceptable region. A reasonable correlation among several identifiers is a good indication of identity. Alternatively, using only a single biometric information sample, a low match score results in failure to authorize an individual. Likewise, a different individual entering a plurality of biometric information samples and trying to gain unauthorized access by, for example, posing as an authorized individual, is unlikely to match evenly across all samples and, whereas a single biometric information sample may match well, several will not. Further examination of an acceptance graph shows that excellent match scores of some samples reduces the necessary match scores for other samples for authorization to occur.

The probability density function is discussed below. Assume a probability density function, $f$, of non-match scores exists. That is, $$f: R \to [0, 1]$$

and $$\int_R f = 1$$

If $S = \{x | x = \text{score}(T_a, T_b), \text{ where } T_a \text{ and } T_b \text{ are characterizations of distinct fingerprints}\}$, then $f$ is 0 outside of $S$, and $$\int_S f = \int_R f = 1$$

It should be noted that $x \in S \Rightarrow x \geq 0$ since score is a measure. An n-dimensional probability density function, g for a sequence of non-match scores is constructed by:

$$g(P) = \prod_i^n f(x_i), \text{ for } P \in R^{11}$$

Since each $f(x_i) \geq 0$, then it follows that $g(P) \geq 0$ and that $$\int_R f = 1 \Rightarrow \int_{R^n} g = 1$$

For any subset $U \subseteq S^n$, the probability that a collection of n scores of non-matching fingerprints lies in U is given by:

$$\int_U g$$

Given an n-dimensional probability density function, g, a region, $U_\alpha \subseteq S^n$ is defined, bounded "below" by a function, $h_\alpha: R^n \to R$.

$$U_\alpha = \{P \in S^n | h_\alpha(P) \geq C_\alpha\}$$

$C_\alpha$, a constant, is calculated such that:

$$\int_{U_\alpha} g = \alpha$$

Thus, given a collection of n fingerprint match scores in the form of a point P, we determine when $P \in U_\alpha$ by applying the threshold function $h_\alpha$. Moreover, the probability that such a collection of scores belongs to $U_\alpha$ is $\alpha$ which can be interpreted as a predetermined false acceptance rate. The criteria $$h_\alpha(P) \geq C_\alpha$$

is used to accept the candidate when true, and reject the candidate otherwise.

Test Case

A large sample consisting of several million non-match comparisons has been generated from a database of fingerprint images in order to create a relative frequency distribution, F(X) of non-matching fingerprint scores. $X = \text{score}(T_a, T_b)$, where $T_a, T_b \in \tau$ are templates of different fingerprints. Note that the frequency distribution is a function of a discrete variable. For the purposes of the test case, we assumed that a continuous probability density function, $f(x)$, of non-matching fingerprint comparisons exists, and all derivations are performed for the continuous case. When a calculation was required in dependence upon actual data, $f$ was approximated by F, and integration was replaced by summation.

When we are given a sequence of n non-matching fingerprint scores, $\{x_i\}$, $1 \leq i \leq n$, then an n-dimensional probability density function, g, is derived as follows: Let $$P = (X_1, X_2, \ldots, X_n)$$

be a particular ordering of the sequence.

$$g(P) = \prod_i^n f(x_i);$$

$$\int_{R^n} g = \int_{R^n} \prod_i^n f(x_i) d\bar{x} = \int_{R^{n-1}} \left( \int_R \left( \prod_i^{n-1} f(x_i) \right) f(x_n) dx_n \right) dx^{n-1}$$

$$= \int_{R^{n-1}} \left( \prod_i^{n-1} f(x_i) \int_R f(x_n) dx_n \right) dx^{n-1} = \int_{R^{n-1}} \left( \prod_i^{n-1} f(x_i) \cdot 1 \right) dx^{n-1}$$

$$= \int_{R^{n-1}} \left( \prod_i^{n-1} f(x_i) \right) dx^{n-1}$$

Repeatedly applying iterated integrals in such a manner, eventually results in $$\int_{R^n} g = 1$$

When $U \subseteq R^n$, the probability that a collection of n scores of non-matching fingerprints lies in U is calculated by iterated integrals over rectangles in $R^n$ by:

$$\int_U g = \int_R g \cdot \chi_u$$

where $U \subseteq R$, and R is a rectangle in $R^n$, and $\chi u$ is the characteristic function of the set U $$\chi u(P) = \begin{cases} 1 & P \in U \\ 0 & P \notin U \end{cases}$$

assuming that $\chi u$ and $f$ are integrable. In the discrete case, we analogously define $$G(P) = \prod_i^n F(x_i)$$

G(P) gives the probability that the n independent scores, $\{x_i\}$ of non-matching finger prints occur in a particular sequence. (Note that g(P) does not give a probability at any specific point since the measure, and hence the integral, over a single point is zero).

For purposes of calculating false acceptance rates in n-dimensions, we must attempt to construct regions in $R^n$ that have desirable properties. Suppose that $\alpha$ and $\beta$ are false acceptance rates. We would like to define regions $U_\alpha$, $U_\beta \subseteq R^n$ such that:

$$\int_{U_\alpha} g = \alpha \text{ and } \int_{U_\beta} g = \beta \quad (1)$$

$$U_\alpha = \{P \in S^n | h_\alpha(P) \geq C_\alpha\}, U_\beta = \{P \in S^n | h_\beta(P) \geq C_\beta\} \quad (2)$$

$$\alpha \leq \beta \Leftrightarrow U_\alpha \subseteq U_\beta \quad (3)$$

$$h_\alpha(P) = C_\alpha \Leftrightarrow g(P) \approx K_\alpha, h_\beta(P) = C_\beta \Leftrightarrow g(P) \approx K_\beta \quad (4)$$

The first condition simply defines a false acceptance rate as a probability. The second condition indicates that regions are bounded below by a threshold function where $C_\alpha$, $C_\beta$ are non-negative constants. The third condition states that when a point is a member of a false acceptance region with a lower probability, it also belongs to a false acceptance region associated with a higher probability. One way to achieve this is to have $h_\alpha = h_\beta$, (i.e. use the same function) and let $C_\beta \leq C_\alpha$. The last condition attempts to ensure that points along or proximate the region boundaries retain substantially level contours on the n-dimensional probability density function. This reduces uneven boundaries "favouring" certain combinations of match scores.

It is worth noting that corresponding n-dimensional false rejection rates are calculated assuming that an analogous n-dimensional probability density function, $g^*$ is constructed from the probability density function of fingerprint match scores. The corresponding false rejection rate for an n-dimensional false rejection rate $_\alpha$ is given by:

$$\int_{Sn-U\alpha} g^*$$

Alternatively, the method is employed with retinal scanned biometric information. Further alternatively, the method is employed with palm prints. Further alternatively, the method is employed with non image biometric data such as voice prints.

One consequence of two different biometric sources is that the above math is complicated significantly. As a false acceptance rate for fingerprints may differ significantly from that of voice recognition devices or retinal scans, a different $f(x)$ arises for the two latter cases resulting in asymmetric regions. For only fingerprint biometric information, ordering of samples is unimportant as false acceptance rates are substantially the same and therefor, the regions defined for registration are symmetrical as shown in FIG. 11. When different biometric source types are used and different functions for false acceptance result, order is important in determining point coordinates and an axis relating to voice recognition false acceptance should be associated with a coordinate value for same.

Referring to FIG. 12 and FIGS. 12a–12f, a method and different embodiments of improving security without requiring performance of additional steps by most individuals are shown. A user presents biometric information to a biometric input device. The information is characterised and the characterised information is matched against a template to determine a registration value. When the registration value is within predetermined limits, user identification is made and the process is complete. When the registration value is within other predetermined limits, the user is prompted for other biometric information. Optionally, the system prompts for each biometric information source a plurality of consecutive times.

For example, a user presents their index finger to a fingerprint scanner; registration fails and access is denied. The user again presents their index finger to the fingerprint scanner; registration fails and access is denied. The user again presents their index finger to the fingerprint scanner; registration fails and access is denied. The user is prompted to present their middle finger to the fingerprint scanner. Alternatively, the user selects and identifies their middle finger as the next biometric information source. The registration of the middle finger is performed according to the invention and therefore is not a same registration process as when the middle finger is the first finger presented to the scanner. The registration relies on the best registration value from the index fingerprints and, with the registration results from the middle finger, determines whether identification should proceed. When unsuccessful registration occurs, the middle finger is presented two more times. When registration is still unsuccesful, another biometric source is requested or is selected by the user. Optionally, when registration results fall below a predetermined threshold, user identification fails. Further optionally, when registration results are within third predetermined limits the method is recommenced, preferably with a biometric information sample of another biometric information source. Alternatively, user identification fails when known biometric information sources of the user are exhausted. Of course, whenever a resulting registration value considered with previous registration values according to the invention results in a sufficiently accurate identification, the user is identified.

Advantages to this method are that the convenience of current fingerprint registration systems is retained for a many individuals; for a number of individuals, an extra fingerprint sample from another finger is required; and, from a small number of individuals, several fingerprints are required. The number is dependent on fingerprint quality, fingerprint characterisation process, desired level of security, population size, etc. It is evident to those of skill in the art that when individuals are enrolled, biometric information from a plurality of biometric information sources is provided, characterised and associated/stored with their identification.

Because of the nature of, for example, fingerprints, the use of multiple fingerprints from a same individual provides an additional correlation as discussed herein. In an embodiment, with each fingerprint presented, analysis and registration provides one of three results—identified, rejected, unsure. When unsure, more biometric information is requested. The individual provides additional fingerprint data and again one of the three results is provided. When an identification or rejection occurs, the process stops. Optionally, a log of access attempts is maintained for later review.

In a further refinement of the embodiment, the processor prompts a user for their identity. When the user provides identification, biometric information is requested from sources in an order that is most likely determinative of the user identity.

For example, when biometric information from an index finger is provided and registered but fails to sufficiently identify the user, further biometric information is requested. The biometric information requested is selected such that a highest likelihood of identification results. Alternatively, the biometric information source is selected such that a highest likelihood of rejection results. Should the next sample of biometric information fail to be determinative—identification or rejection, further biometric information from another source is requested again attempting to make a final determination fastest.

When a user identity is not provided, a data structure indicating a next biometric information source to request is produced from all biometric information. In dependence upon a registration value of a current biometric information sample, user identification, rejection, or requesting further biometric information results. In the latter case, the requested information is determined based on the known biometric information and registration values associated therewith. For example, biometric information is provided from a first biometric information source. Registration is performed and is inconclusive. It is determined that a particular biometric information source comprises information most likely to result in identification or failure thereby being determinative; that biometric information source is polled.

When selecting subsequent biometric information sources, preferably, all possible outcomes are analysed and the outcome of failed identification is not itself considered a single outcome but is weighted more heavily. The advantages to this approach are evident from the example below.

In another example for use in identifying individuals by searching a database of enrolled individuals, biometric information is provided from a right thumb. Registration is performed and is inconclusive determining that the right thumb is likely that of John, Susan, or Peter but may also be that of Jeremy, Gail, Brenda, or Joe. A next biometric information source is selected such that clear discrimination between the individuals results and a likely identification will occur. The next biometric information source is one that easily eliminates a large number of the potential individuals. In this example, the right ring finger is selected because Susan and Peter have very distinctive ring fingers. Biometric information from the right ring finger is provided and registered with templates in the database. Though the right ring finger is most likely that of Jim or Susan, it is evident that Susan, appearing in both lists, is the front runner. Also, the registration result for Peter is sufficiently low that it is unlikely that Peter is the individual. Though neither registration value would identify Susan on its own with the desired level of security, when the two registrations are taken together, Susan is indeed identified. Alternatively, when the resulting list is still not conclusive—two or more people identified or noone identified with sufficient certainty, further biometric information from another biometric information source is requested.

The data is arranged such that in dependence upon previous registration results a next biometric information source is polled. Using such a system, searching large databases for accurate registration is facilitated and reliability is greatly increased. Preferably, the database is precompiled to enhance performance during the identification process.

In another embodiment, templates are formed by characterising a plurality of fingerprints of an individual and constructing a single composite template comprising fingerprint information from each fingerprint. Using such a composite template, identification of biometric information sources is obviated. For example, an individual provides a fingerprint to a biometric imaging device. The imaged fingerprint is provided to a processor. The processor need not be provided with information regarding the biometric source—the exact finger—in order to perform template matching. The fingerprint is registered with a single composite template to produce a registration value. The registration value is used to identify the individual, prompt the individual for another fingerprint, or reject the individual.

Methods of forming composite templates include selecting a plurality of features from each fingerprint, selecting similar features from each fingerprint, forming a data structure indicative of fingerprint identification and indicative of features, etc. In an embodiment a data structure comprises a first feature to verify. When present, a next feature or set of features is verified. When absent a different feature or set of features is verified. By providing the data in a tree structure such as a binary tree, finger and registration values are identified simultaneously. Also, a data structure allows for compilation of a known group of biometric information, e.g. 10 fingerprints, for use with the present invention wherein identification is dependent upon a plurality of different biometric information samples.

Alternatively, single composite templates having a plurality of features from each fingerprint are formed by mapping selected features and information regarding the features into the composite template. This allows for a processing of the template against a characterised fingerprint to produce a registration value. Often, the registration process using composite templates is different from that using individual templates.

Another method of forming composite templates is to form templates having finer and finer resolutions each associated with a smaller group of templates. For example, a first coarse template determines whether or not to match the characterised fingerprint against other finer templates. In use, a fingerprint is compared against coarse templates. When a match within predetermined limits occurs, finer templates associated with the coarse template are also matched against the fingerprint. When the match is not within predetermined limits, the finer templates associated with the coarse templates and all finer templates associated therewith are excluded from further matching. This improves performance of the individual identification system.

The arrangement of data for the present method is similar to that of a tree structure. A coarse template may be a same template for different finer templates. Therefore, registration is performed against a small number of coarse templates in order to limit the number of finer templates. The process is repeated at each node of the tree until an identification of the individual or until a most likely node is determined. Further biometric information from a different biometric information source is registered in a similar fashion. Because each node as one descends throughout the tree structure toward the leaves is related to fewer individuals, an intersection of potential individuals from each search determines potential identifications. Preferably, more than one potential node is identifiable with each biometric information source. For example, registration of the index finger results in a selection of two nodes—a and b. Each node is associated with a number of individuals. Registration of the middle finger is associated with three different nodes—c, d, and e. An intersection $(a \cup b) \cap (c \cup d \cup e)$ results in potential identifications. When the intersection contains a small number of individuals, registration against individual templates is performed according to the method and using each biometric sample provided from a different biometric information source in order to identify the individual with a predetermined level of security.

Numerous other embodiments may be envisaged without departing from the spirit and scope of the invention.

What is claimed is:

1. A method of registering biometric information of an individual comprising the steps of:
   a) providing a first biometric information sample from a biometric source of the individual to a biometric input device in communication with a host processor;
   b) using the host processor, registering the first biometric information sample with a first template to produce a first registration value;
   c) when the first registration value is within predetermined limits, identifying the individual;
   d) when the first registration value is within other predetermined limits, providing a current biometric information sample from a different biometric source of the individual to a biometric input device in communication with the host processor;
   e) using the host processor, registering the current biometric information sample with a second template to produce a current registration value;
   f) when the first registration value relates to a security levels below a predetermined threshold value and a combination of at least the first registration value and the current registration value relates to a security level above a same predetermined threshold, identifying the individual, wherein the first registration value when taken in isolation, if the individual were authorised or identified, would result in a security level below a predetermined minimum allowable security level; and g) when the first registration value and the current registration value are within second other predetermined limits, repeating steps (d) through (g).

2. A method of registering biometric information of an individual as defined in claim 1 comprising the step of when the registration values are within third predetermined limits, recommencing the method.

3. A method of registering biometric information of an individual as defined in claim 1 comprising the step of identifying a biometric source of a biometric sample.

4. A method of registering biometric information of an individual as defined in claim 1 wherein the step of when the first registration value and the current registration value are within second other predetermined limits, repeating steps (d) through (g) comprises the steps of:

the host processor determining a biometric information source for provision to the biometric input means; and, prompting the individual for further biometric information from the determined biometric information source.

5. A method of registering biometric information of an individual as defined in claim 4 wherein the biometric information sources are determined at random.

6. A method of registering biometric information of an individual as defined in claim 4 wherein the biometric information sources are determined in dependence upon at least one of previous biometric information samples provided from the individual, the first registration value, the current registration values, and a provided identity for the individual.

7. A method of registering biometric information of an individual as defined in claim 1 wherein determining when registration values based on different biometric samples provided from a same individual are within predetermined limits is performed by the step of: determining if a point in a multidimensional probability distribution and having coordinates corresponding to the registration values falls within a multidimensional probability range determined in dependence upon a predetermined false acceptance rate.

8. A method of registering biometric information of an individual as defined in claim 1 comprising the step of providing an indication of user identity corresponding to the individual.

9. A method of registering biometric information of an individual as defined in claim 1 wherein the predetermined limits are based on a false acceptance rate.

10. A method of registering biometric information of an individual in dependence upon stored templates of biometric information as defined in claim 1 wherein the first template and the second template are a same composite template.

11. A method of registering biometric information of an individual comprising the steps of:

a) providing a first biometric information sample, $S_1$, from a biometric source of the individual to a biometric input device in communication with a host processor;

b) using the host processor registering the first biometric information sample with a first template to produce a first registration value, $R_1$;

c) when the first registration value, $R_1$, is within predetermined limits, identifying the individual;

d) when the first registration value, $R_1$, is within other predetermined limits, providing a current biometric information sample, $S_n$, from a different biometric source of the individual to a biometric input device in communication with the host processor, where n is of the sequence 1, 2, 3, 4, 5, . . . and n=1 for the first sample and the first registration value associated therewith;

e) using the host processor, registering the current biometric information sample with a second template to produce a current registration value, $R_n$;

f) when the first (n−1) registration value relates to a security levels below a predetermined threshold value and a combination of the n registration values relates to a security level above a same predetermined threshold, providing an indication, wherein the first registration value when taken in isolation, if the individual were authorised or identified, would result in a security level below a predetermined minimum allowable security level and wherein the first n−1 registration values when taken as a group, if the individual were authorised or identified, would result in a security level below a predetermined minimum allowable security level; and g) when the first n−1 registration values are within second other predetermined limits, repeating steps (d) through (g).

12. A method of registering biometric information of an individual as defined in claim 11 wherein the step of providing an indication includes the step of identifying the individual.

13. A method of registering biometric information of an individual as defined in claim 11 comprising the step of:

when a registration value is below a predetermined threshold, providing another biometric information sample of a same source;

replacing the current biometric information sample, $S_n$, with the other biometric information sample of a same source;

e) using the host processor, registering the other biometric information sample with a second template to produce another registration value; and, replacing the current registration value, $R_n$, with the other registration value.

14. A method of registering biometric information of an individual as defined in claim 13 wherein the step (f) comprises the steps of:

determining if a point in a multidimensional probability distribution and having coordinates corresponding to the registration values, $R_1$ . . . $R_n$, falls within a multidimensional probability range determined in dependence upon a predetermined false acceptance rate.

15. A method of registering biometric information of an individual as defined in claim 11 further comprising the steps of:

the host processor determining biometric information sources for provision to the biometric input means; and, prompting the individual to provide biometric information from each source.

16. A method of registering biometric information of an individual as defined in claim 15 wherein the biometric information sources are determined in dependence upon at least one of previous biometric information from the individual, previous registration values, and a provided identity for the individual.

17. A method of registering biometric information of an individual as defined in claim 11 comprising the step of providing an indication of user identity corresponding to the individual.

18. A method of registering biometric information of an individual in dependence upon stored templates of biometric information comprising the steps of:

a) providing an indication of the individual's identity;

b) providing biometric information from a known biometric information source of the individual to a host processor;

c) registering the biometric information against a template of biometric information from the same source to determine a registration value using the host processor;

d) determining if a point having coordinates in an n-dimensional probability distribution, n having an integer value greater than 1, and having coordinates corresponding to the determined registration values falls within an n-dimensional probability range determined in dependence upon a predetermined false acceptance rate corresponding to a security level above a predetermined threshold wherein a point having co-ordinates in an (n−1)-dimensional probability distribution corresponding to n−1 of the registration values relates to a security level below the predetermined threshold;

e) identifying the individual when the point falls within the n-dimensional probability range corresponding to the predetermined false acceptance rate; and, f) repeating steps (b) through (f) when the point falls within a second other n-dimensional probability range.

19. A method of registering biometric information of an individual in dependence upon stored templates of biometric information as defined in claim 18 wherein each time the step (f) is repeated, the value of n is incremented by one.

20. A method of registering biometric information of an individual in dependence upon stored templates of biometric information as defined in claim 18 comprising the step of g) returning to step (a) and recommencing the process of registering biometric information when the point falls outside the first other n-dimensional probability range and outside the second other n-dimensional probability range.

21. A method of registering biometric information of an individual as defined in claim 18 wherein the biometric information sources of an individual forms further data for use in determining the security level of the combination of the plurality of registration values.

22. A method of registering biometric information of an individual as defined in claim 18 wherein all registration values are below the predetermined threshold and the combined registration values are above a same predetermined threshold.

23. A method of registering biometric information of an individual as defined in claim 1 wherein the biometric information sources of an individual forms further data for use in determining the security level of the combination of the plurality of registration values.

24. A method of registering biometric information of an individual as defined in claim 1 wherein all registration values are below the predetermined threshold and the combined registration values are above a same predetermined threshold.

25. A method of registering biometric information of an individual as defined in claim 11 wherein the biometric information sources of an individual forms further data for use in determining the security level of the combination of the plurality of registration values.

26. A method of registering biometric information of an individual as defined in claim 11 wherein all registration values are below the predetermined threshold and the combined registration values are above a same predetermined threshold.

* * * * *

UNITED STATES PATENT AND TRADEMARK OFFICE
CERTIFICATE OF CORRECTION

PATENT NO. : 6,072,891
DATED : June 6, 2000
INVENTOR(S) : Hamid, et al.

It is certified that error appears in the above-identified patent and that said Letters Patent is hereby corrected as shown below:

In sheet 11, Fig. 10:
- the X axis legend should read -- score --;
- a particular point between 500 and 600 should read -- t --;
- from t, a vertical line should join the curve to the axis;
- from t to 1000, the area under the curve should be shaded.

In sheet 12, Fig. 11:
- the X axis legend should read -- score 1--;
- the Z axis legend should read -- score 2 --;
- the shaded area should be labeled -- B --.

Figure 12:
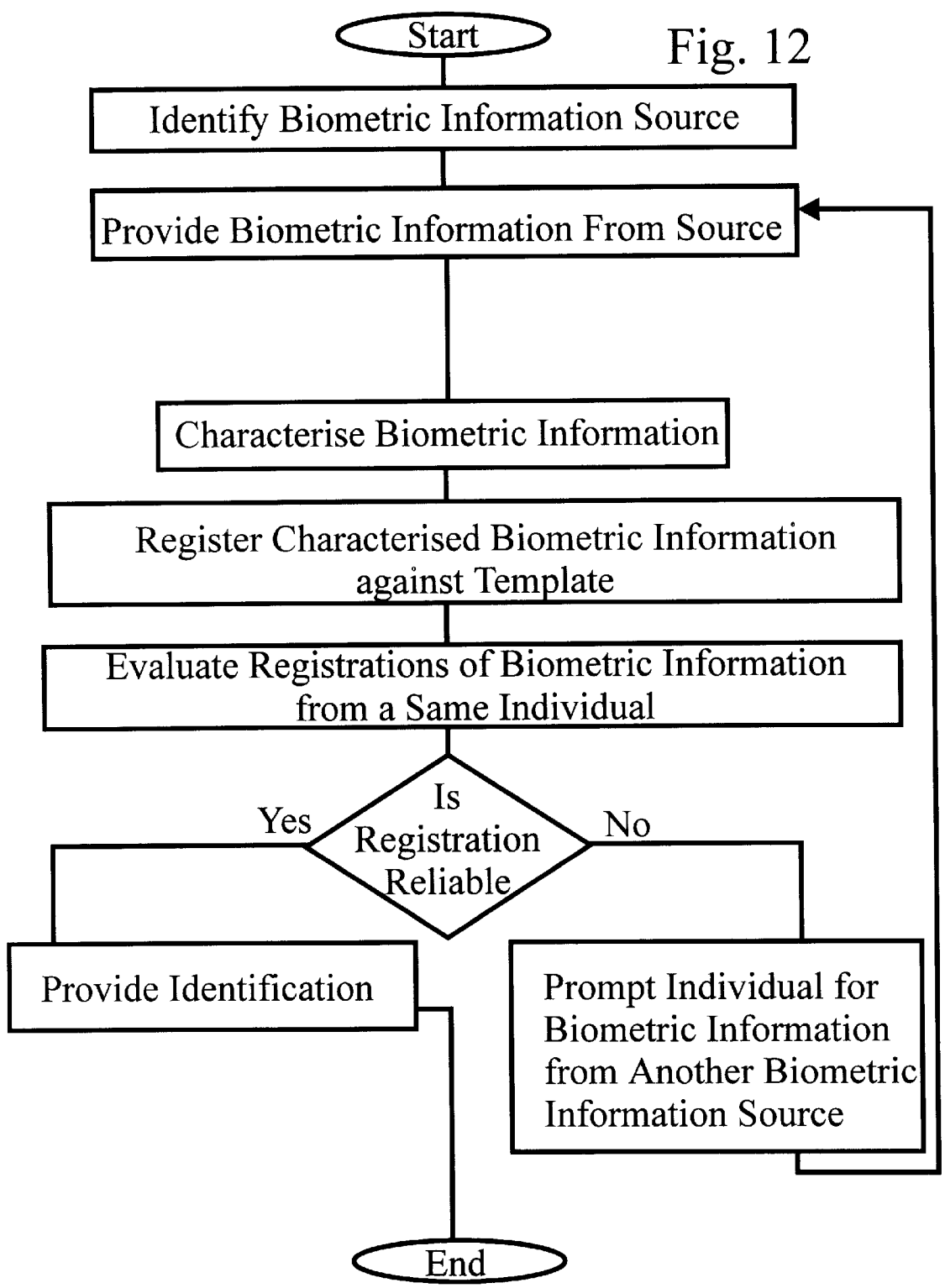
FIG. 12 is a flow diagram of another method of providing biometric information and identifying an individual in dependence thereon according to the invention.
Figure 12A:
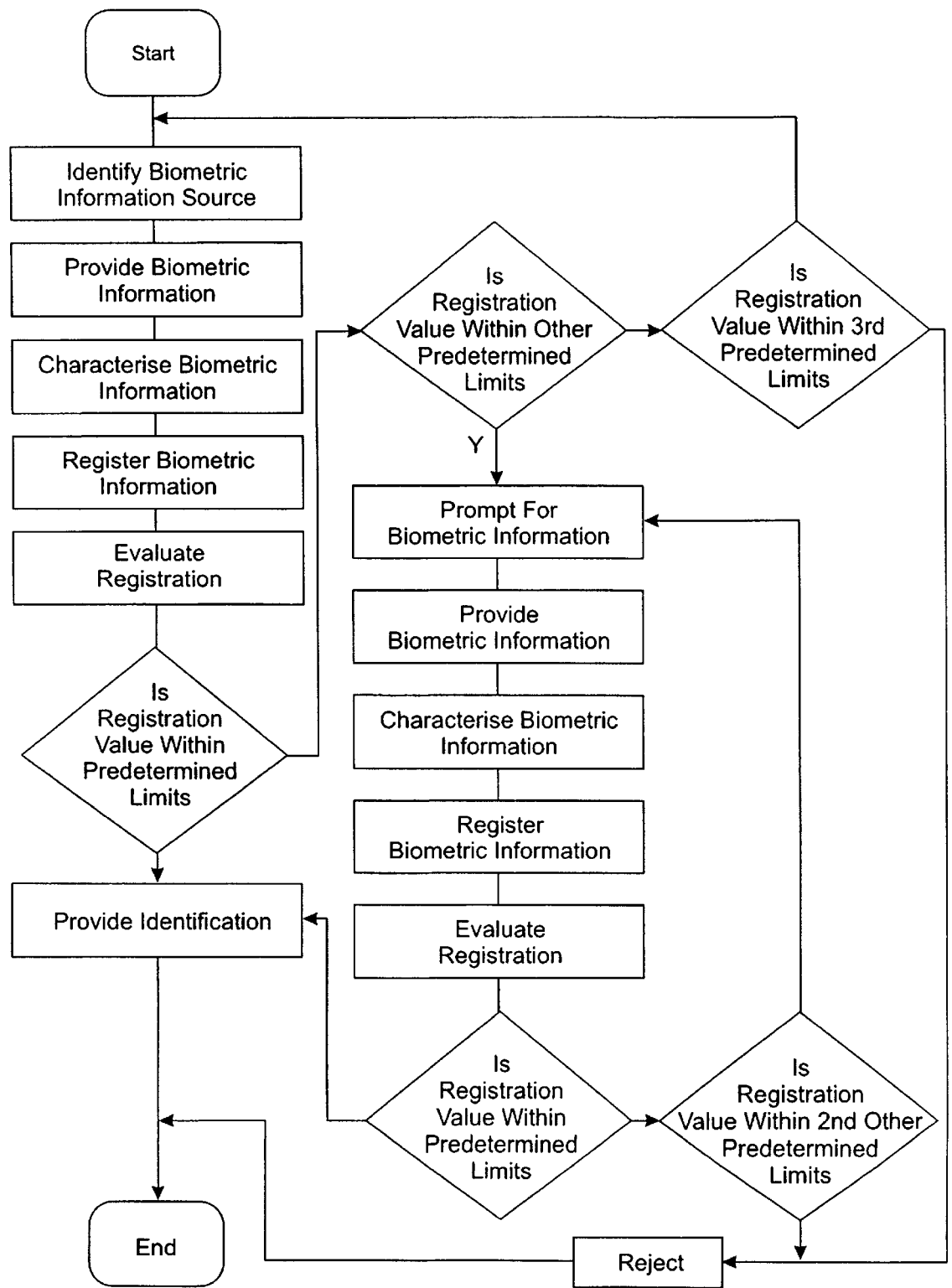
FIG. 12a is a flow diagram of another embodiment of the method shown in FIG. 12.
Figure 12B:
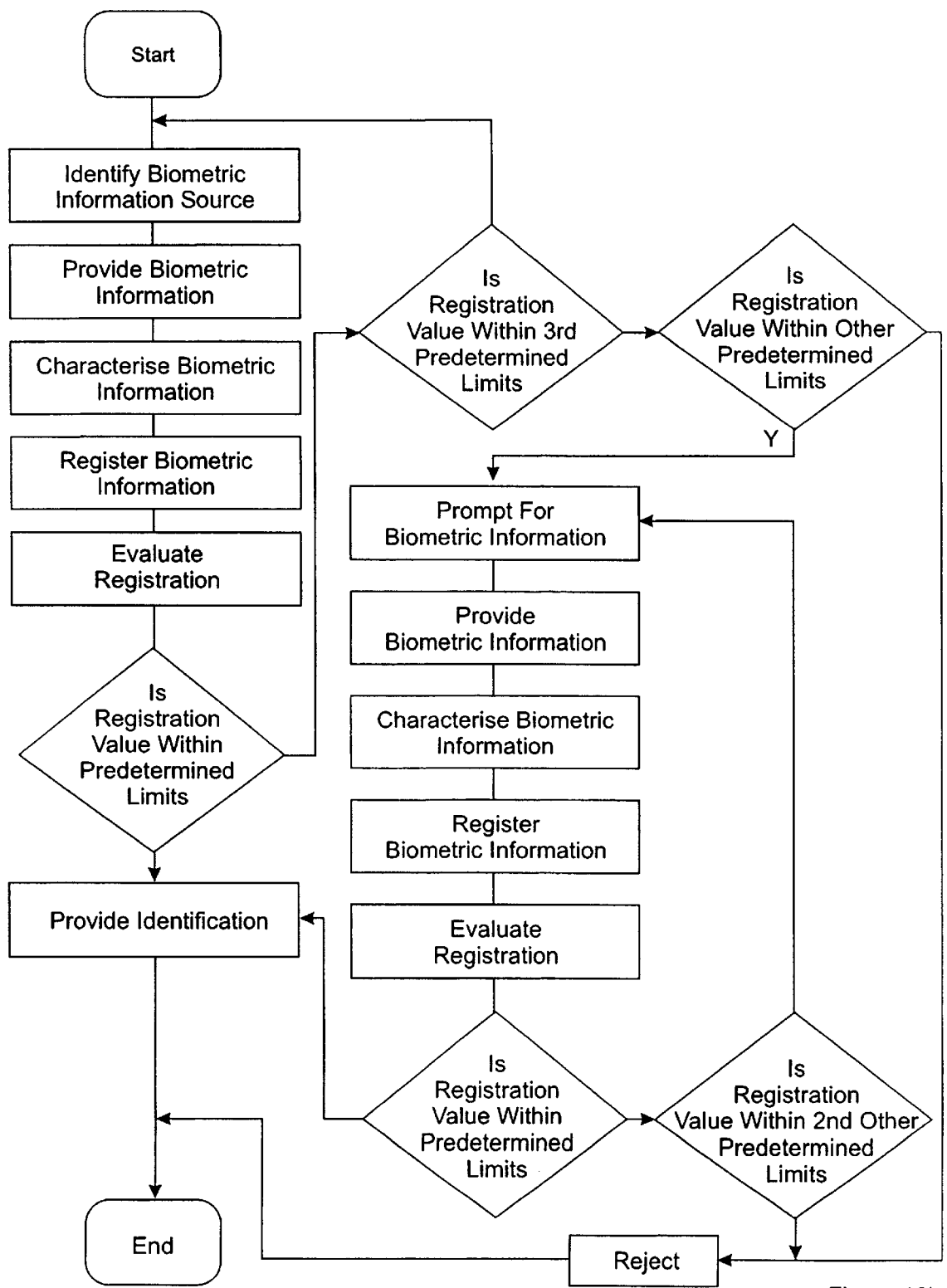
FIG. 12b is a flow diagram of another embodiment of the method shown in FIG. 12.
Figure 12C:
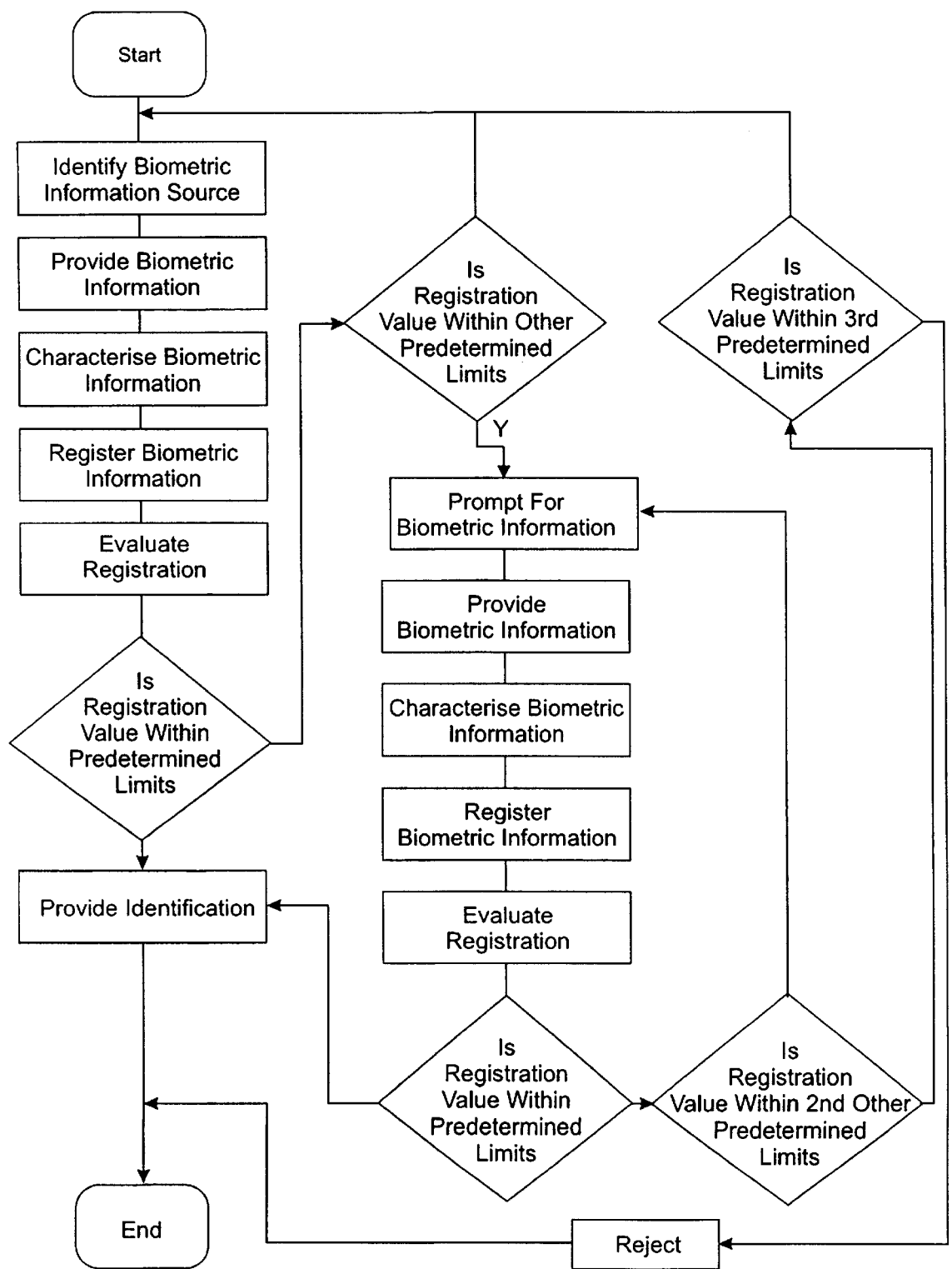
FIG. 12c is a flow diagram of another embodiment of the method shown in FIG. 12.
Figure 12D:
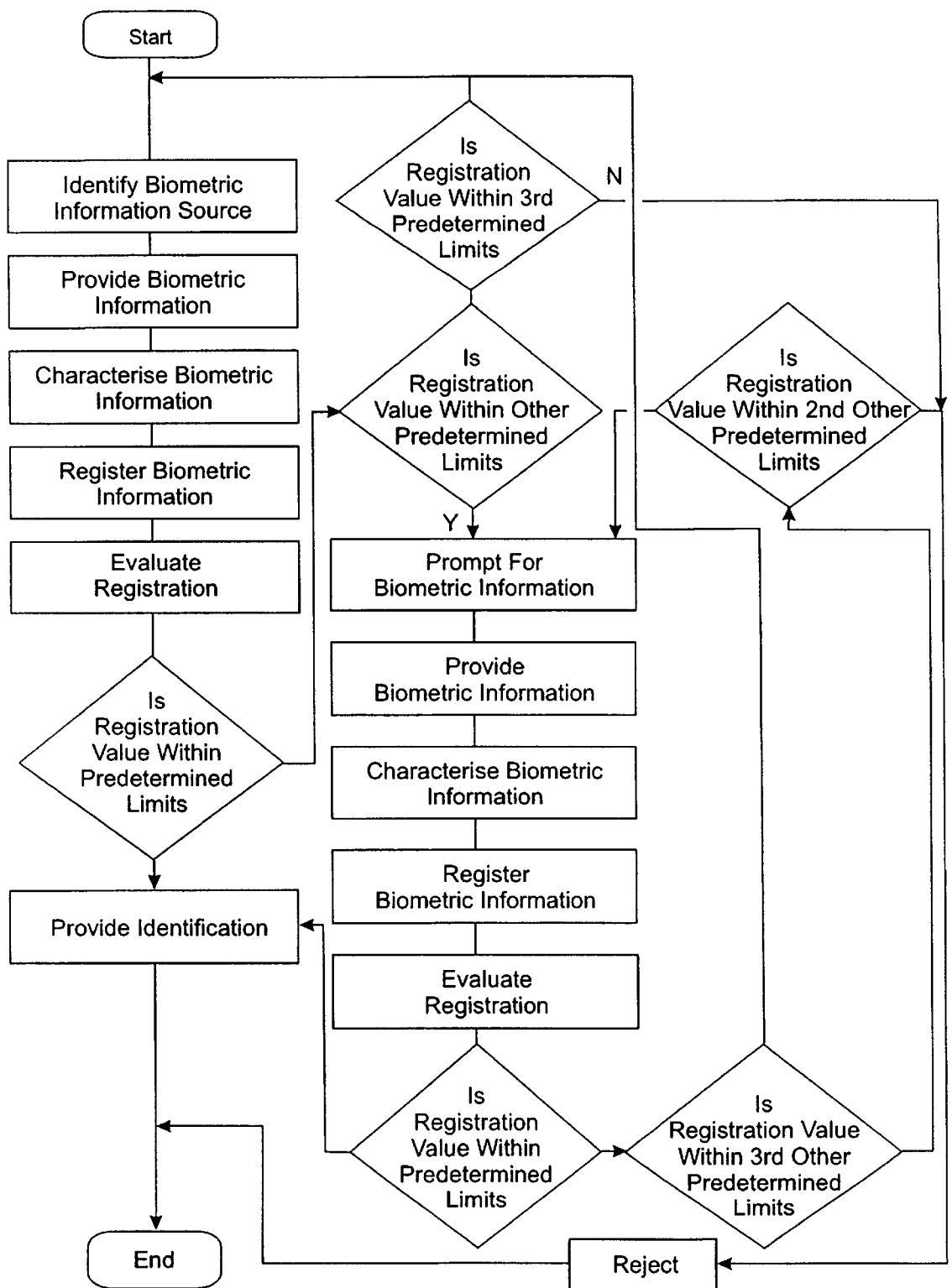
FIG. 12d is a flow diagram of another embodiment of the method shown in FIG. 12.
Figure 12E:
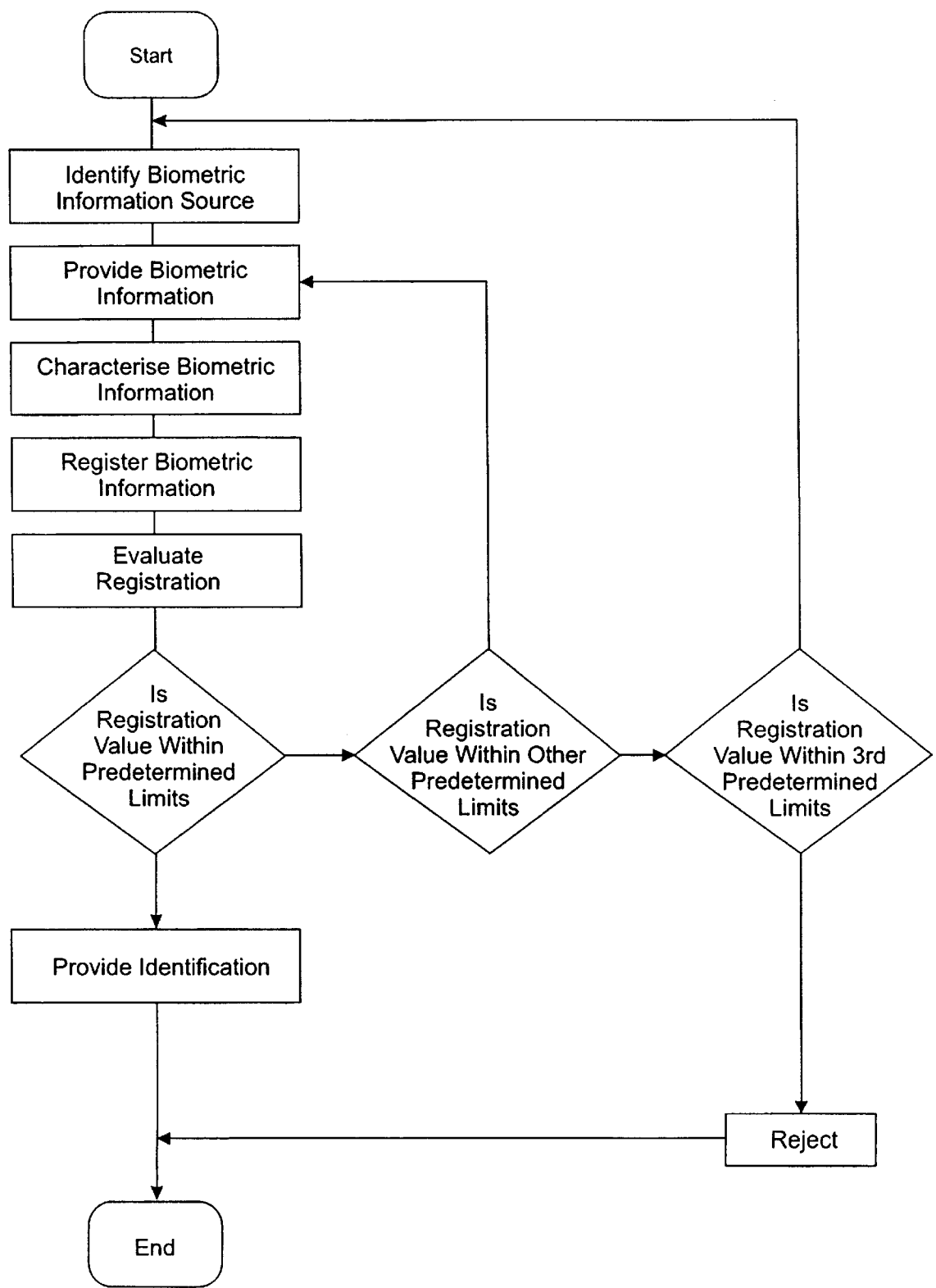
FIG. 12e is a flow diagram of another embodiment of the method shown in FIG. 12; and, FIG. 12f is a flow diagram of another embodiment of the method shown in FIG. 12.
Figure 12F:
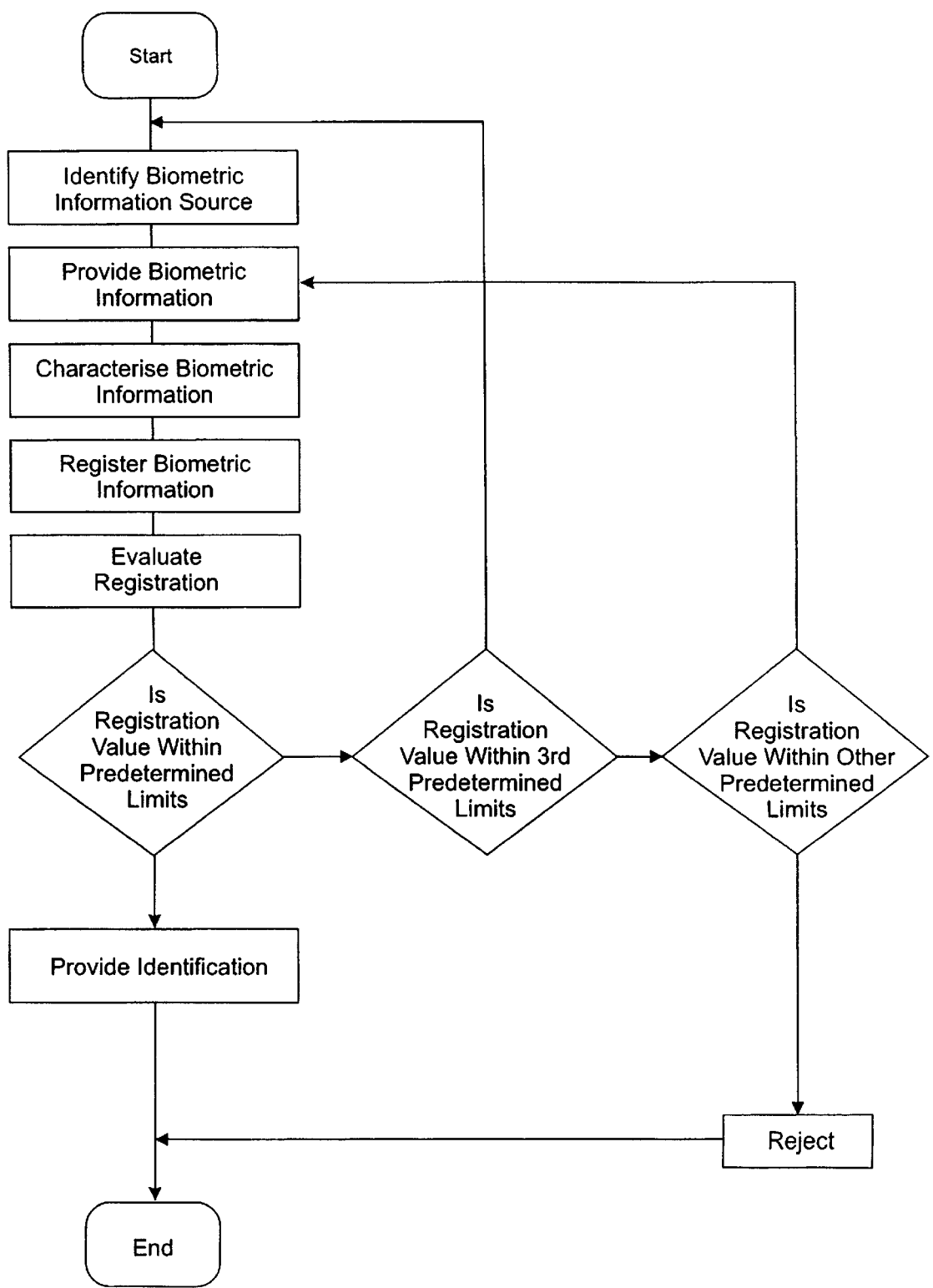

In sheet 13, Fig. 12, "Information against Template" should read -- Information against Associated Template --.

Col. 1, line 59, "surfacc" should read -- surface --;

Col. 7, line 14, "arc" should read -- are --;

Col. 8, line 4, "} 1" should read -- }, 1 --;

Col. 8, line 5 "$I_R \subset I$" should read -- $I_R \subseteq I$ --;

Col. 11, line 20, "$R^{ll}$" should read -- $R^n$ --;

UNITED STATES PATENT AND TRADEMARK OFFICE
CERTIFICATE OF CORRECTION

PATENT NO. : 6,072,891
DATED : June 6, 2000
INVENTOR(S) : Hamid, et al.

It is certified that error appears in the above-identified patent and that said Letters Patent is hereby corrected as shown below:

Col. 11, line 25, "$Rn$" should read -- $R^n$ --;

Col. 11, line 39, "$U\alpha$" should read -- $U_\alpha$ --;

Col. 12, line 5, "$g(P)$" should read -- Define $g(P)$ --;

Col. 12, line 6 should read -- since $\int_R f = \int_S f = \int_0^\infty f(x)dx = 1$ --;

Col. 12, line 7 should read -- and $R^n = R^{n-1} \times R$ --.

Col. 12, line 8 should read -- then it follows that --;

Col. 12, line 22, "$Rn$" should read -- $R^n$ --;

Col. 12, in formulas 3 and 4, "$\Leftrightarrow$" should read -- $\Rightarrow$ --;

Col. 13, line 14, "$Sn\text{-}U\alpha$" should read -- $S^n\text{-}U_\alpha$ --;

UNITED STATES PATENT AND TRADEMARK OFFICE
CERTIFICATE OF CORRECTION

PATENT NO. : 6,072,891
DATED : June 6, 2000
INVENTOR(S) : Hamid, et al.

It is certified that error appears in the above-identified patent and that said Letters Patent is hereby corrected as shown below:

The signs " $\geqq$ " should read -- $\geq$ -- all over the text.

The signs " $\leqq$ " should read -- $\leq$ -- all over the text.

In claim 11 b), "processor registering" should read -- processor, registering--.

Signed and Sealed this

Eighth Day of May, 2001

*Attest:*

NICHOLAS P. GODICI

*Attesting Officer*     Acting Director of the United States Patent and Trademark Office

UNITED STATES PATENT AND TRADEMARK OFFICE
CERTIFICATE OF CORRECTION

PATENT NO. : 6,072,891
DATED : June 6, 2000
INVENTOR(S) : Hamid et al.

It is certified that error appears in the above-identified patent and that said Letters Patent is hereby corrected as shown below:

Drawings,
In sheet 11, Fig. 10:
- the X axis legend should read -- score --;
- a particular point between 500 and 600 should read -- t --;
- from t, a vertical line should join the curve to the axis;
- from t to 1000, the area under the curve should be shaded.

In sheet 12, Fig. 11:
- the X axis legend should read -- score 1 --;
- the Z axis legend should read -- score 2 --;
- the shaded area should be labeled -- B --.

In sheet 13, Fig. 12, "Information against Template" should read -- Information against Associated Template --.

Column 1,
Line 59, "surface" should read -- surface --;

Column 7,
Line 14, "arc" should read -- are --;

Column 8,
Line 4, "} 1" should read -- ], 1 --;
Line 5, "$I_R \subset I$" should read -- $I_R \subseteq I$ --;

Column 11,
Line 20, "$R^{11}$" should read -- $R^n$ --;
Line 25, "Rn" should read -- $R^n$ --;
Line 39, "Ua" should read -- $U_a$ --;

Column 12,
Line 5, "g(P)" should read -- Define $g(P)$ --;
Line 6, should read -- since
Line 7, should read -- and $R^n = R^{n-1} \times R$ --.
Line 8, should read -- then it follows that --;
Line 22, "Rn" should read -- $R^n$ --;
In formulas 3 and 4, "$\Leftrightarrow$" should read -- $\Rightarrow$ --;

Column 13,
Line 14, "$Sn$-$Ua$" should read -- $S^n$-$U_a$ --;

UNITED STATES PATENT AND TRADEMARK OFFICE
CERTIFICATE OF CORRECTION

PATENT NO. : 6,072,891  
DATED : June 6, 2000  
INVENTOR(S) : Hamid et al.

It is certified that error appears in the above-identified patent and that said Letters Patent is hereby corrected as shown below:

Column 13, cont'd,  
The signs "$\geq$" should read -- $\geq$ -- all over the text.  
The signs "$\leq$" should read -- $\leq$ -- all over the text.

Claim 11 b),  
"processor registering" should read -- processor, registering --.

Signed and Sealed this

Twenty-Seventh of November, 2001

*Attest:*

NICHOLAS P. GODICI  
*Attesting Officer*   Acting Director of the United States Patent and Trademark Office

UNITED STATES PATENT AND TRADEMARK OFFICE
CERTIFICATE OF CORRECTION

PATENT NO. : 6,072,891
DATED : June 6, 2000
INVENTOR(S) : Laurence Hamid et al.

It is certified that error appears in the above-identified patent and that said Letters Patent is hereby corrected as shown below:

This certificate supersedes Certificate of Correction issued November 27, 2001. The Certificate was issued in error and should be vacated.

Signed and Sealed this

Twenty-first Day of January, 2003

JAMES E. ROGAN
*Director of the United States Patent and Trademark Office*